(12) United States Patent
Rai et al.

(10) Patent No.: US 7,386,178 B2
(45) Date of Patent: *Jun. 10, 2008

(54) METHOD AND APPARATUS FOR TRANSFORMING THE DIMENSIONS OF AN IMAGE

(75) Inventors: Barinder Singh Rai, Surrey (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 661 days.

This patent is subject to a terminal disclaimer.

(21) Appl. No.: 10/902,552

(22) Filed: Jul. 29, 2004

(65) Prior Publication Data

US 2006/0023952 A1    Feb. 2, 2006

(51) Int. Cl.
G06K 9/36    (2006.01)
G06K 9/46    (2006.01)
(52) U.S. Cl. ...................... 382/232; 382/305
(58) Field of Classification Search ............... 382/232, 382/162, 164, 166, 233, 276, 277, 248, 305; 345/503, 531, 542, 545, 553, 565
See application file for complete search history.

(56) References Cited

U.S. PATENT DOCUMENTS

| | | | |
|---|---|---|---|
| 5,193,003 A | 3/1993 | Kondo | |
| 5,237,646 A | 8/1993 | Bunce | |
| 5,359,694 A | 10/1994 | Concordel | |
| 5,543,823 A | 8/1996 | Kurisu | |
| 5,671,440 A | 9/1997 | Curry | |
| 5,754,710 A | 5/1998 | Sekine et al. | |
| 5,801,776 A * | 9/1998 | Tamura et al. | 375/240.18 |
| 5,806,072 A | 9/1998 | Kuba et al. | |
| 5,809,174 A | 9/1998 | Purcell et al. | |
| 5,977,947 A | 11/1999 | Potu | |
| 6,002,411 A | 12/1999 | Dye | |
| 6,067,098 A | 5/2000 | Dye | |
| 6,151,074 A | 11/2000 | Werner | |
| 6,212,300 B1 | 4/2001 | Rengakuji | |
| 6,263,119 B1 | 7/2001 | Martucci | |
| 6,333,951 B1 | 12/2001 | Tamura et al. | |
| 6,348,925 B1 | 2/2002 | Potu | |
| 6,559,826 B1 | 5/2003 | Mendelson et al. | |
| 6,573,901 B1 * | 6/2003 | Rai | 345/547 |
| 6,931,069 B2 | 8/2005 | Hatano et al. | |

(Continued)

FOREIGN PATENT DOCUMENTS

GB    2345400    7/2000

(Continued)

Primary Examiner—Brian Werner
Assistant Examiner—Michael Vanchy, Jr.
(74) Attorney, Agent, or Firm—Mark P. Watson

(57) ABSTRACT

The invention is directed to a method and apparatus for transforming the dimensions of an image represented by block-interleaved data. The method comprises: (a) storing a first minimum coded unit of the image data in a first memory; (b) dimensionally transforming the first minimum coded unit; and (c) storing a second minimum coded unit of the image data in the first memory. Steps (b) and (c) are performed after step (a). In addition, step (b) is performed before: starting to store any third minimum coded unit in the memory after step (c). The apparatus comprises a first memory, a storing circuit, a dimensional transforming circuit, and a timing control circuit. Preferably, the first memory is sized for storing no more than two minimum coded units.

26 Claims, 13 Drawing Sheets

U.S. PATENT DOCUMENTS

| | | |
|---|---|---|
| 7,136,193 B2 | 11/2006 | Takata et al. |
| 7,202,917 B2 | 4/2007 | Katoh et al. |
| 2002/0085767 A1 | 7/2002 | Epstein et al. |
| 2002/0131084 A1 | 9/2002 | Andrew et al. |
| 2002/0135585 A1 | 9/2002 | Dye et al. |
| 2002/0180744 A1 | 12/2002 | Takala et al. |
| 2003/0048951 A1 | 3/2003 | Rengakuji et al. |
| 2003/0117513 A1* | 6/2003 | Anderson .............. 348/333.11 |
| 2005/0001857 A1 | 1/2005 | Nakakita et al. |
| 2005/0063597 A1 | 3/2005 | Mao et al. |
| 2005/0286775 A1 | 12/2005 | Jeffrey et al. |

FOREIGN PATENT DOCUMENTS

| | | |
|---|---|---|
| JP | 2002135596 | 5/2002 |
| JP | 2004165733 | 6/2004 |
| WO | WO 01/91039 A1 | 11/2001 |

* cited by examiner

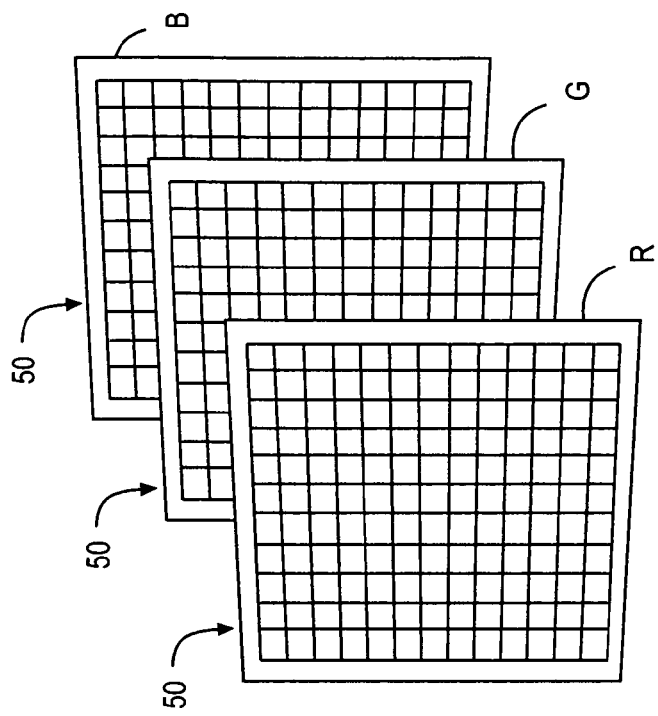
(PRIOR ART) FIG. 4
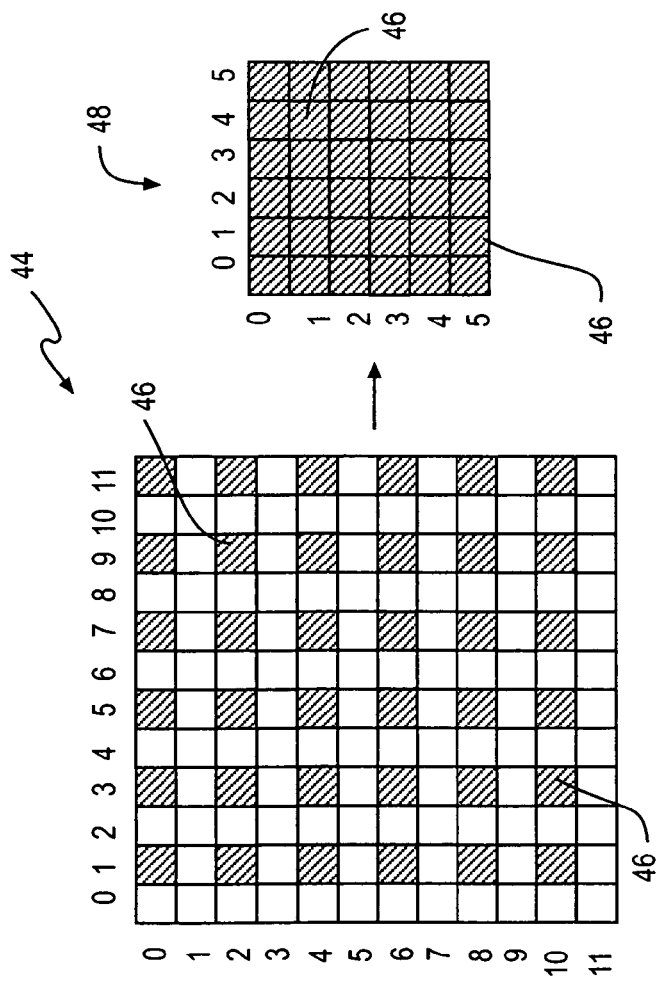
(PRIOR ART) FIG. 3

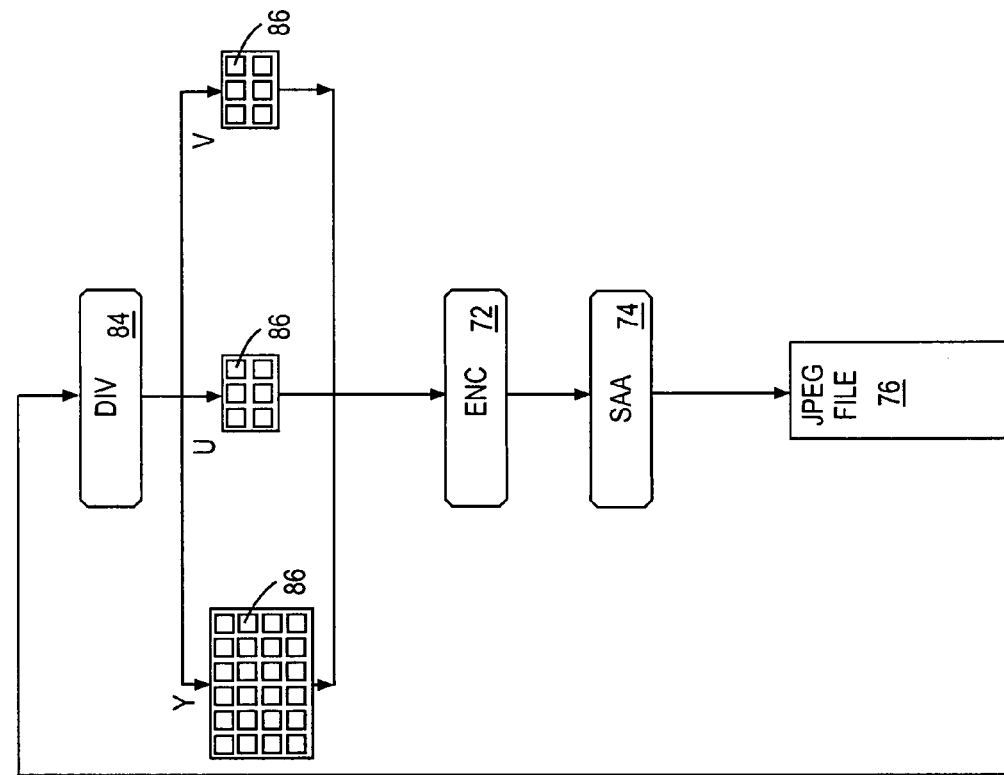
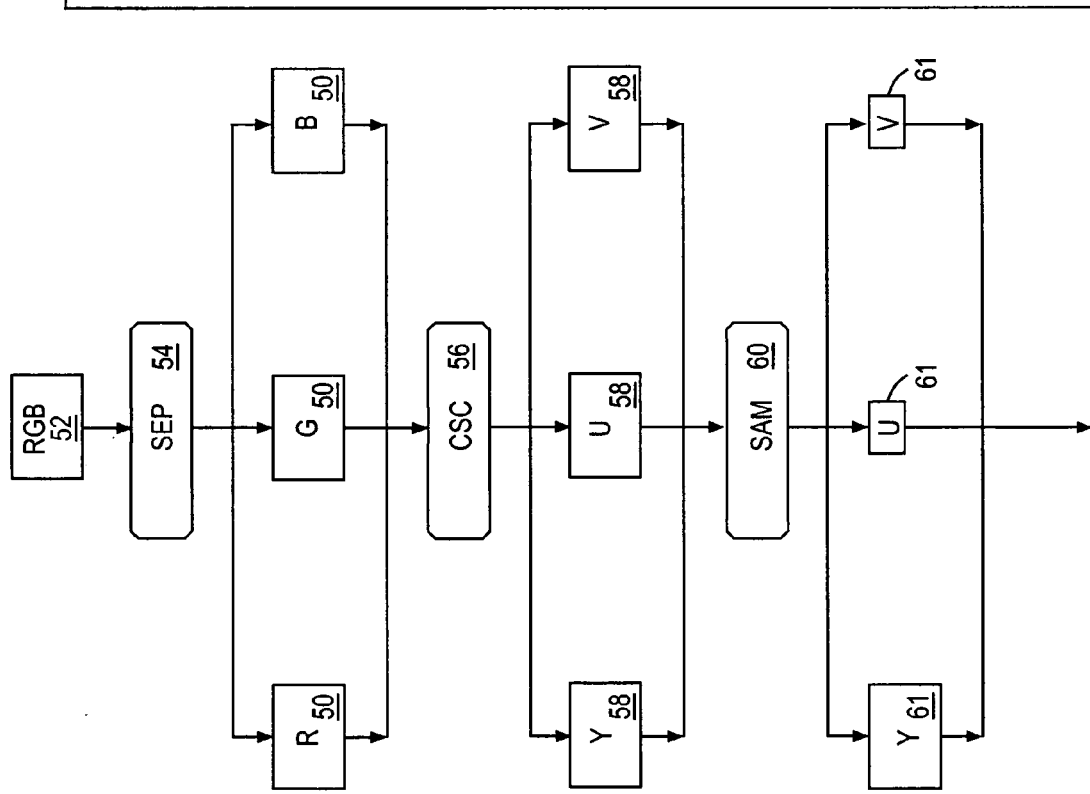
FIG. 5 (PRIOR ART)

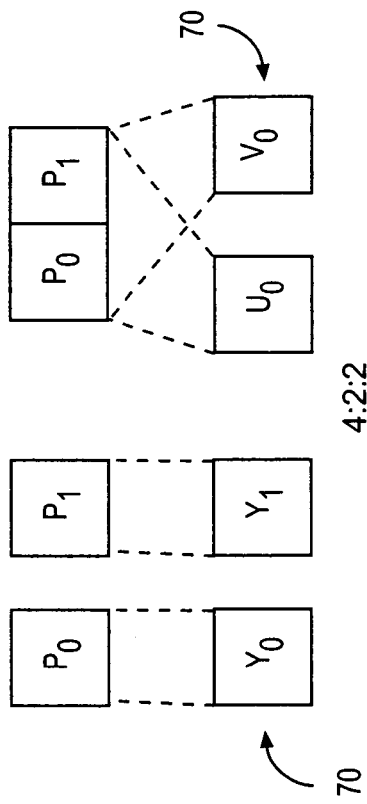
FIG. 7a (PRIOR ART)
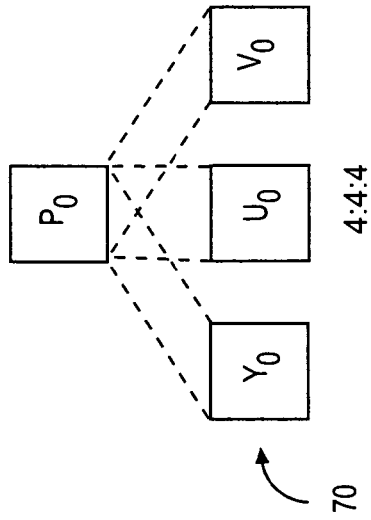
FIG. 7b (PRIOR ART) 4:4:4
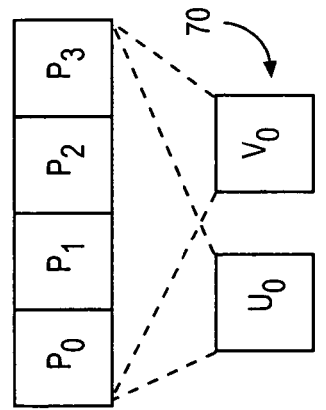
FIG. 7c (PRIOR ART) 4:2:2
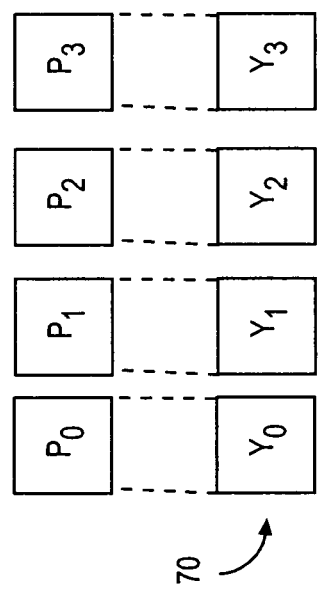
FIG. 7d (PRIOR ART) 4:1:1

METHOD AND APPARATUS FOR TRANSFORMING THE DIMENSIONS OF AN IMAGE

FIELD OF THE INVENTION

The present invention relates generally to image processing, and more particularly to a method and apparatus for transforming the dimensions of an image represented by block-interleaved data.

BACKGROUND OF THE INVENTION

The term "computer system" today applies to a wide variety of devices. The term includes mainframe and personal computers, as well as battery-powered computer systems, such as personal digital assistants and cellular telephones. In computer systems, a graphics controller is commonly employed to couple a CPU to a display device, such as a CRT or an LCD. The graphics controller performs certain special purpose functions related to processing image data for display so that the CPU is not required to perform such functions. For example, the graphics controller may include circuitry for decompressing image data as well as an embedded memory for storing it.

In a display device, an image is formed from an array, often referred to as a frame, of small discrete elements known as "pixels." Display devices receive image data arranged in raster sequence and render it in a viewable form. A raster sequence begins with the left-most pixel on the top line of an array of pixels, proceeds pixel-by-pixel from left to right, and when the end of the top line is reached proceeds to the second line, again beginning with the left-most pixel. The sequence continues in this manner to each successively lower line until the end of the last line is reached.

The term pixel has another meaning; it also refers to the datum used to define a displayed pixel's attributes, such as its brightness and color. For example, in a digital color image, pixels are commonly comprised of 8-bit component triplets, which together form a 24-bit word that defines the pixel in terms of a particular color model. A color model is a method for specifying individual colors within a specific gamut of colors and is defined in terms of a three-dimensional Cartesian coordinate system (x, y, z). The RGB model is commonly used to define the gamut of colors that can be displayed on an LCD or CRT. In the RGB model, each primary color—red, green, and blue—represents an axis, and particular values along each axis are added together to produce the desired color. Each color is represented by 8 of the 24 bits. Similarly, pixels in display devices have three elements, each for producing one primary color, and particular values for each component are combined to produce a displayed pixel having the desired color. In a digital gray scale image, a single 8-bit component defines each pixel.

Image data requires considerable storage and transmission capacity. For example, consider a single 512×512 color image comprised of 24-bit pixels. The image requires 768 K bytes of memory and, at a transmission rate of 128 K bits/second, 48 seconds for transmission. While it is true that memory has become relatively inexpensive and high data transmission rates more common, the demand for image storage capacity and transmission bandwidth continues to grow apace. Further, larger memories and faster processors increase energy demands on the limited resources of battery-powered computer systems. One solution to this problem is to compress the image data before storing or transmitting it. The Joint Photographic Experts Group (JPEG) has developed a popular method for compressing still images. Using a JPEG coding method, a 512×512 color image can be compressed into a JPEG file that may be only 40-80 K bytes in size (depending on the compression rate and the visual properties of the particular image) without creating visible defects in the image when it is displayed.

Before JPEG coding of a color image, the pixels are commonly converted from the RGB color model to a YUV model. In addition, a color source image is separated into component images, that is, Y, U, and V images. (Of course, this step is not necessary if the source image is a gray-scale image as these images have only one component.)

The JPEG standard employs a forward discrete cosine transform (DCT) as one step in the compression (or coding) process and an inverse DCT as part of the decoding process. In an image, pixels and their components are distributed at equally spaced intervals. Just as an audio signal may be sampled at equally spaced time intervals and represented in a graph of amplitude versus time, pixel components may be viewed as samples of a visual signal, such as brightness, and plotted in a graph of amplitude versus distance. The audio signal has a time frequency. The visual signal has a spatial frequency. Moreover, just as the audio signal can be mapped from the time domain to the frequency domain using a Fourier transform, the visual signal may be mapped from the spatial domain to the frequency domain using the forward DCT. The human auditory system is often unable to perceive certain frequency components of an audio signal. Similarly, the human visual system is frequently unable to perceive certain frequency components of a visual signal. JPEG coding recognizes that the data needed to represent unperceivable components may be discarded allowing the quantity of data to be reduced.

According to the JPEG standard, the smallest group of data units coded in the DCT is a minimum coded unit (MCU), which comprises three or more blocks for a YUV image and one block for a gray-scale image. A "block" is an 8×8 array of "samples", a sample being one element in the two-dimensional array that describes a component. (In this specification, the terms "sample", "pixel component", or simply "component" have the same meaning.) Every sample in each component image may be selected for JPEG compression. In this case, the MCU for a YUV image comprises three blocks, one for each component. Commonly, however, a subset of the samples in the U and V blocks are selected for compression. This step is often referred to as chroma sub-sampling. For instance, only 50% or 25% of the samples in the U and V components may be selected (chroma sub-sampled) for compression. In these cases, the MCU comprises four blocks and six blocks, respectively. The phrase "sampling format" is used to distinguish among the various types of chroma sub-sampling. Typical sampling formats are 4:4:4, 4:2:2, 4:2:0, and 4:1:1, which are further described below. The blocks for each MCU are grouped together in an ordered sequence, e.g. $Y_0U_0V_0$ or $Y_0Y_1U_0V_0$, where the subscript denotes the block. The MCUs are arranged in an alternating or interleaved sequence before being compressed, and this data format is referred to as "block-interleaved."

When a JPEG file is received, it is normally decoded by a special purpose block of logic known as a CODEC (compressor/decompressor). The output from the decoding process is block-interleaved image data. As the CODEC is adapted to work in many different computer systems, it is not designed to output image data in any format other than the block-interleaved format. Display devices, however, are not adapted to receive block-interleaved image data; rather display devices expect pixels arranged in raster sequence. Moreover, operations performed by the graphics controller before the pixels are provided to the display, such as resizing and color space conversion, are adapted to be performed on raster-ordered pixels.

In order that the image data can be operated on and provided to the display as raster ordered pixels, the output of the CODEC, that is, the block-interleaved image data, is stored as blocks in a memory commonly referred to as a line buffer. As the image data for any particular pixel is needed, three samples are fetched from respective component blocks that are stored in scattered locations in the line buffer. The samples are assembled into pixels, processed, and stored in raster sequence in a memory, usually referred to as a display or frame buffer. Pixels are then sequentially fetched from the frame buffer and provided to the display device.

The line buffer must be large enough to hold at least one line of pixels of the image. The reason is that the graphics controller is designed to operate on raster ordered data. Moreover, the line buffer generally must be large enough to hold at least two display lines. This is because one line is read from the line buffer while another is being stored by the CODEC in a "ping-pong" scheme. Because JPEG decoded block-interleaved image data is made up of 8×8 blocks of samples, it is not possible to simply store a single line. Instead, all of the blocks needed to assemble a line must be stored. This number of blocks sufficient to assemble a line is the same number as the number of blocks sufficient to store 8 lines. In other words, to store one line, the line buffer must be large enough to hold 8 lines. And to alternately store one line while another is being read in ping-pong fashion, the line buffer must be large enough to store 16 lines.

Because the line buffer must be able to hold at least 16 lines of image data, it requires a considerable amount of memory. Further, the size of a line buffer embedded in a graphics controller is predetermined when the integrated circuit (IC) is designed. Because the maximum width of a source image that can be JPEG decoded is limited by the size of the line buffer, the only way to provide the flexibility for handling source images of varying sizes is to provide a line buffer that is large enough to hold the largest expected image width.

Memory is expensive in terms of the physical space and the power it requires. For these reasons, it would be desirable to reduce the amount of memory required for the line buffer. Moreover, it would be desirable to provide the flexibility to decompress JPEG coded images of various sizes without having to create an IC in which the line buffer is large enough to accommodate the largest expected image width even though narrower images are commonly processed. Accordingly, there is a need for a method and apparatus for transforming the dimensions of an image represented by block-interleaved data.

BRIEF SUMMARY OF THE INVENTION

The invention is directed to a method and apparatus for transforming the dimensions of an image represented by block-interleaved data.

The method comprises: (a) storing a first minimum coded unit of the image data in a first memory and (b) dimensionally transforming the first minimum coded unit. Step (b) is performed after step (a). A step (c) provides for storing a second minimum coded unit of the image data in the first memory. The step (c) is also performed after step (a). In addition, step (b) is performed before: starting to store any third minimum coded unit in the memory after step (c).

Preferably, the method includes a step of grouping the image data in the first minimum coded unit into pixels. Further, the step (b) preferably further comprises reading the pixel components needed to reconstruct pixels arranged in a particular sequence.

The apparatus comprises a first memory, a storing circuit, a dimensional transforming circuit, and a timing control circuit. The storing circuit stores minimum coded units of image data in the first memory. The dimensional transforming circuit dimensionally transforms the minimum coded units stored in the first memory. The timing control circuit controls the storing circuit, such that: The storing circuit stores at a time (a) a first minimum coded unit in the first memory, and stores at a time (c) after time (a) a second minimum coded unit in the first memory. In addition, the timing control circuit controls the dimensional transforming circuit, such that: the dimensional transforming circuit dimensionally transforms the first minimum coded unit after the time (a), and before the storing circuit starts to store any third minimum coded unit in the first memory after time (c).

Preferably, the dimensional transforming circuit is adapted for grouping the image data in the first minimum coded unit into pixels. In addition, the first memory is preferably sized for storing no more than two minimum coded units. Further, the dimensional transforming circuit is preferably adapted for grouping the image data into pixels by reading the pixel components needed to reconstruct pixels in arranged in a particular sequence.

The objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 3 is a view of the cropped frame of FIG. 3 and a scaled frame.

FIG. 4 is a perspective view of a frame as a set of component images.

FIG. 5 is a block diagram illustrating the creation of a JPEG file.

FIGS. 7a-7d illustrate a source image and blocks formed by selecting samples from the source image according to three exemplary sampling formats.

DETAILED DESCRIPTION OF A PREFERRED EMBODIMENT

Figure 1:
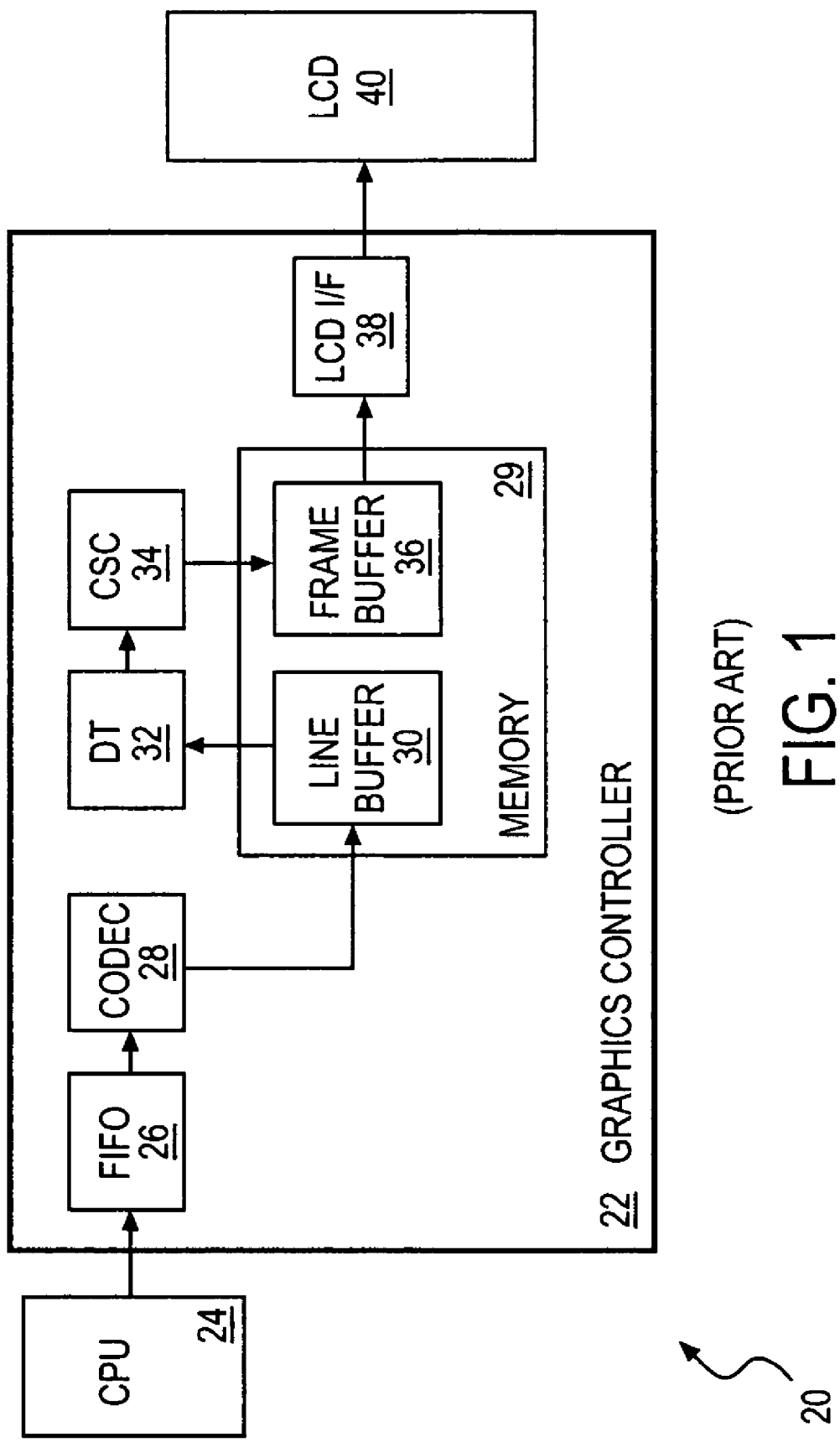
FIG. 1 is a block diagram of a computer system for receiving and decoding a JPEG file, processing decoded image data for display, and displaying an image.

The invention is directed to a method and apparatus for transforming the dimensions of an image represented by block-interleaved image data. This specification describes the present preferred embodiments of the invention, examples of which are illustrated in the accompanying drawings. Wherever possible, the same reference numbers are used in the drawings and the specification to refer to the same or like parts, blocks, and steps.

FIG. 1 illustrates a block diagram of a computer system 20 having a graphics controller 22 coupled to a CPU 24 and an LCD 40. FIG. 1 is but one preferred context for the invention. The graphics controller 22 includes a FIFO memory 26, used for buffering data received from the CPU 24, and a CODEC 28. In addition, the graphics controller 22 includes an embedded memory 29, part of which is set aside as a line buffer 30 and another part of which is set aside as a frame buffer 36. The graphics controller 22 also includes a dimensional transform ("DT") circuit 32, a color space conversion ("CSC") circuit 34, and an LCD interface ("I/F") circuit 38.

By way of additional background, the transformation operations performed by dimensional transform circuit 32 and the format of the image data will be described before the operation of computer system 20 is described.

Figure 2:
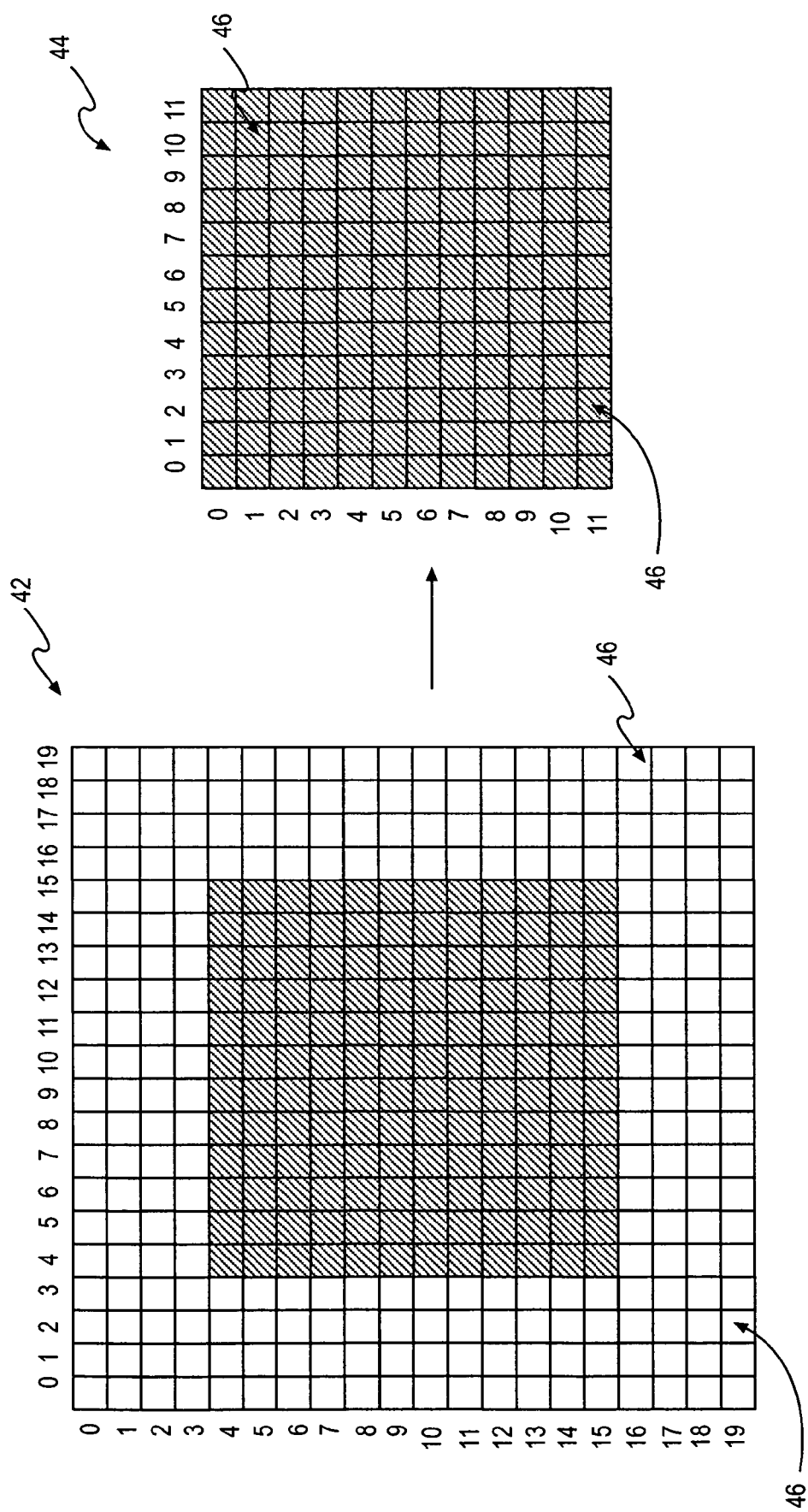
FIG. 2 is a view of an original and a cropped frame.

FIG. 2 shows one type of dimensional transformation operation that may be performed on a frame before it is displayed. This is a cropping operation. An exemplary frame 42 and a cropped frame 44 are illustrated in FIG. 2. Each frame comprises a plurality of pixels 46, each pixel being represented by a square. The coordinate position of a particular pixel 46 is given by the numbers along the top and left side of the frame. The amount by which an image is cropped is determined by a set of cropping parameters. Specifically, the cropping parameters define which areas are to be removed from the frame 42 and may be specified in terms of coordinate values. For example, the cropping parameters may be start and stop pixels in the horizontal and vertical directions. For instance, if a distance equal to four pixels is to be removed from the top, bottom, and each side of frame 42, the coordinates of the start pixel are (4, 4) and that of the stop pixel are (15, 15).

FIG. 3 illustrates another dimensional transformation operation that may be performed on a frame before it is displayed. FIG. 3 shows a scaling operation. The amount by which an image is scaled is determined by a scale factor. For example, if the cropped frame 44 is to be reduced to one-fourth its original size, the scale factor is one-half. An image may be scaled using any one of a number of algorithms. When an image is scaled according to a simple linear algorithm using a scale factor of one-half, every other row of pixels is discarded and every other pixel within a row is discarded. Scaling the cropped frame 44 using this linear algorithm and a scale factor of one-half produces the cropped and scaled frame 48. To illustrate the mapping of rows of pixels and pixels within rows that are not discarded, FIG. 3 also shows the coordinates of two exemplary pixels 46 ([2, 9] and [10, 3]) in frame 44 and the location of these pixels in the scaled frame 48.

The phrase "dimensional transform" is used in this specification to refer operations that change the size of a frame either by cropping the frame, scaling it, or both. The term is intended to include any algorithms for cropping, scaling, and other similar operations that are now known or later become known in the art.

FIG. 4 shows an alternative view of a frame of pixels. As mentioned, the attributes of an RGB pixel can be represented by a 3-byte word. In FIG. 4, three component images 50 are shown, that is, all of the R components of the pixels are shown at their respective coordinate locations in an R frame, all of the G components are shown in a G frame, and all of the B components are shown in a B frame. Similar component images may be formed with images represented in other color models, such as YUV.

FIG. 5 is a block diagram showing aspects of the creation of a JPEG file. Generally, the creation of a JPEG file begins with a source image 52 in RGB format. A first step 54 ("SEP") separates the RGB image into R, G, and B component images 50. The component images 50 correspond to the component images of FIG. 4. The second step 56 ("CSC") converts the R, G, and B component images 50 into Y, U, and V component images 58.

In a step 60 ("SAM") of chroma sub-sampling, the component images 58 are chroma sub-sampled according to a predetermined sampling format. Commonly, the sampling format is 4:4:4, 4:2:2, 4:1:1, or 4:2:0. In the 4:4:4 sampling format, all of the Y, U, and V samples are selected for compression, respectively, from the Y, U, and V component images. If the sampling format is 4:2:2, again all of the Y samples are selected, but only fifty percent of the U and V samples are selected.

Figures 6A, 6B, 6C:
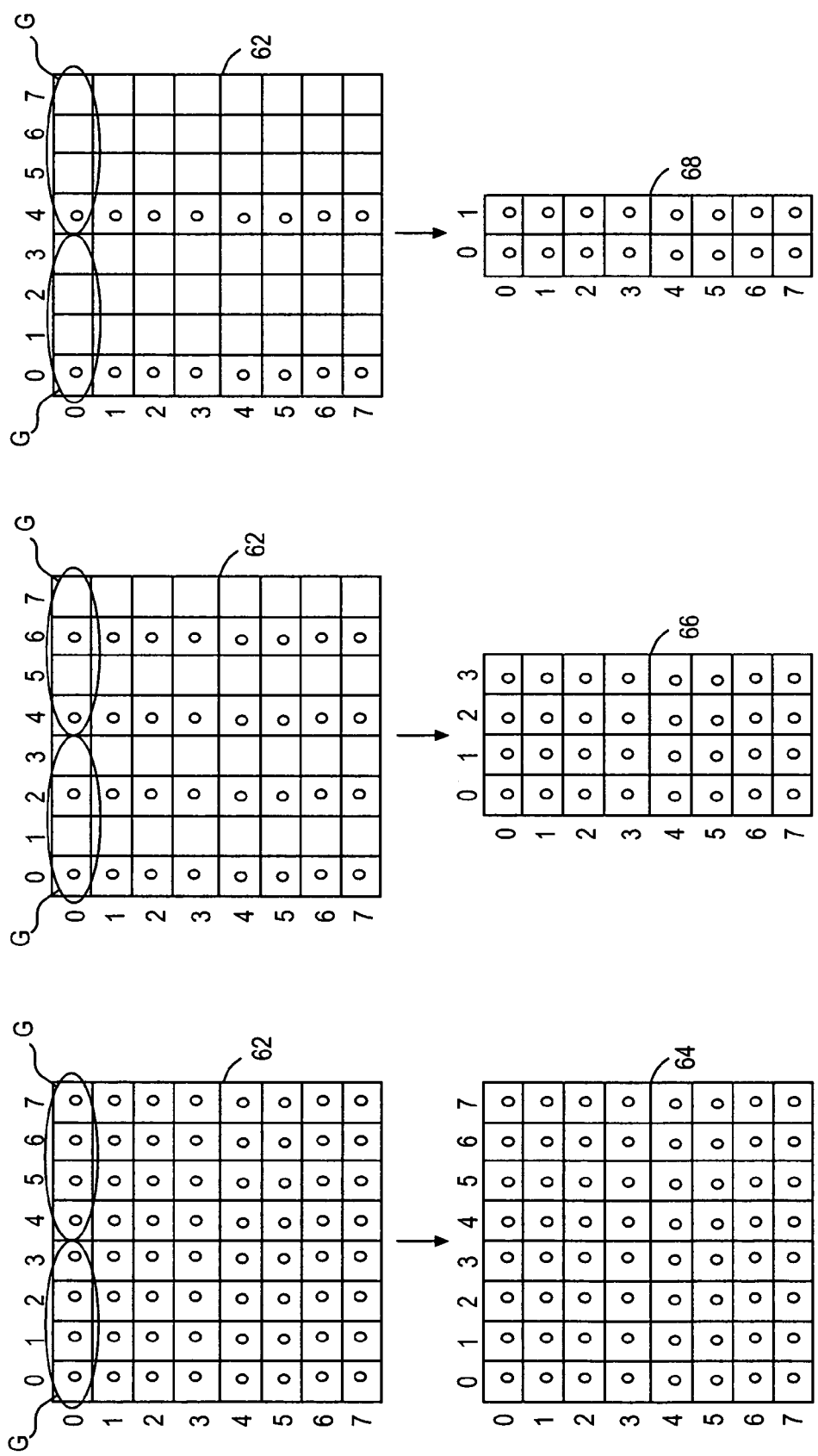
FIGS. 6a-6c illustrate, respectively, three exemplary methods for selecting samples from a component image.

FIGS. 6*a*-*c* illustrate chroma sub-sampling. Each block 62 is an 8×8 matrix of Y, U, or V samples. Blocks of samples are always N×N (square) matrices. Each sample is represented by a square within the block, and a circle within the square indicates that the sample is selected. A square which does not have a circle in it is discarded. In each block, each row consists of two groups G of four consecutive samples. In FIG. 6*a*, all of the samples in each group G of four are selected, forming the collection of samples 64. In FIG. 6*b*, the first and third samples in each group G are selected to form the collection of samples 66. In FIG. 6*c*, the collection of samples 68 are formed as a result of only the first sample in each group being selected. Because blocks are required, in this example, to be 8×8, the collections of samples 66 and 68 are not large enough to form a full block. These collections are combined with other similar collections of components to create 8×8 blocks.

FIGS. 7*a*-*d* further illustrate chroma sub-sampling. FIGS. 7*a*-*d* show how a source image 52 is mapped into component blocks 70 for various sampling formats. FIG. 7*a* shows source image 52. In this example, the source image 52 comprises twenty-four 8×8 blocks of pixels $P_0$ to $P_{23}$. In FIG. 7*b* samples have been selected using a 4:4:4 sampling format. The component blocks $Y_0$, $U_0$, and $V_0$ are created from pixel block $P_0$ (as shown with dashed lines). In FIG. 7*c* samples have been selected using a 4:2:2 sampling format. The component blocks $Y_0$ and $Y_1$ are created, respectively, from pixel blocks $P_0$ and $P_1$. These pixel blocks also together create one 8×8 block of U samples and one 8×8 block of V samples, i.e., $U_0$ and $V_0$. In FIG. 7*d*, samples have been selected using a 4:1:1 sampling format. Four component blocks of Y are created from pixel blocks $P_0$ to $P_3$. But only one block each of U and V components are created from these four pixel blocks. The smallest group of data units coded in a forward DCT is an MCU. In these figures, the blocks 70 form an MCU for the specified sampling format.

Referring again to the creation of a JPEG file depicted in FIG. 5, the step 60 of chroma sub-sampling produces collection of samples 61. In a step 84 ("DIV"), each of the collection of samples is arranged into a plurality of square blocks 86 of samples. Preferably, the blocks 86 are 8×8.

Each block 86 is JPEG encoded in a step 72 ("ENC"), that is, each block is separately compressed according to a JPEG method. In a step 74 ("SAA"), compressed blocks of pixel components are selected and arranged into a JPEG file 76.

Figure 8:
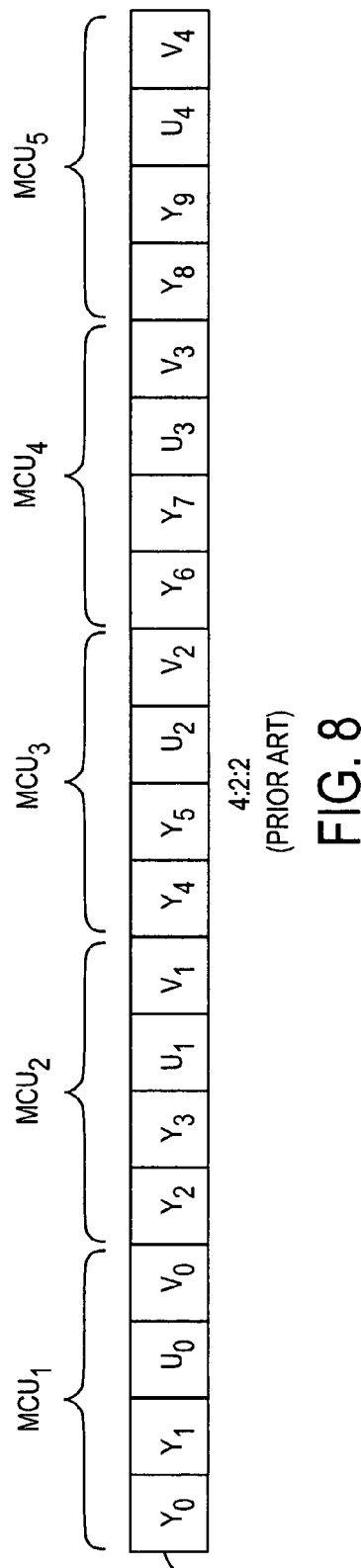
FIG. 8 shows a block-interleaved JPEG file.

FIG. 8 illustrates a JPEG file 76. In the JPEG file 76, the image data is block-interleaved according to a 4:2:2 sampling format. The JPEG file 76 consists of two sequential blocks of the Y component, followed by one block from each of the U and V components. This pattern is repeated for all of the blocks of the component images. If a different sampling format is used, the block-interleaved format will be modified accordingly.

Having described the transformation operations performed by dimensional transform circuit 32 and the format of the image data, the operation of computer system 20 is now described.

FIG. 1 shows the path that image data takes from JPEG file format to raster ordered pixels ready for display. In operation, the CPU 24 writes a JPEG file to the FIFO 26. The CPU 24 is an illustrative device; the JPEG file may be written by another device, such as a camera, a network interface module, a memory controller, or any other device with data transfer capabilities. The CODEC 28 accesses the FIFO 26, decompresses the JPEG file using an inverse DCT-based process, and writes decoded block-interleaved image data to the line buffer 30. The dimensional transform circuit 32 dimensionally transforms the image data stored in the line buffer 30. As the circuit 32 transforms image data it also reconstructs pixels at it fetches the samples needed to define a particular pixel.

The dimensional transform circuit 32 sends the reconstructed YUV pixels to the color space conversion circuit 34. The CSC circuit 34 converts the pixels into the RGB format and stores them in the frame buffer 36 in raster order. The LCD interface circuit 38 reads pixels from the frame buffer 36 and sends them in raster order to the display device 40 for display. The display device 40 is illustrated as an LCD, however, a CRT or any similar device for rendering image data for viewing may be substituted.

A limitation of the dimensional transform circuit 32 is that it requires a full line of image data before it can begin to dimensionally transform image data. The reason for this is that the dimensional transform circuit 32 transforms the image data pixel-by-pixel in raster order.

Figure 9:
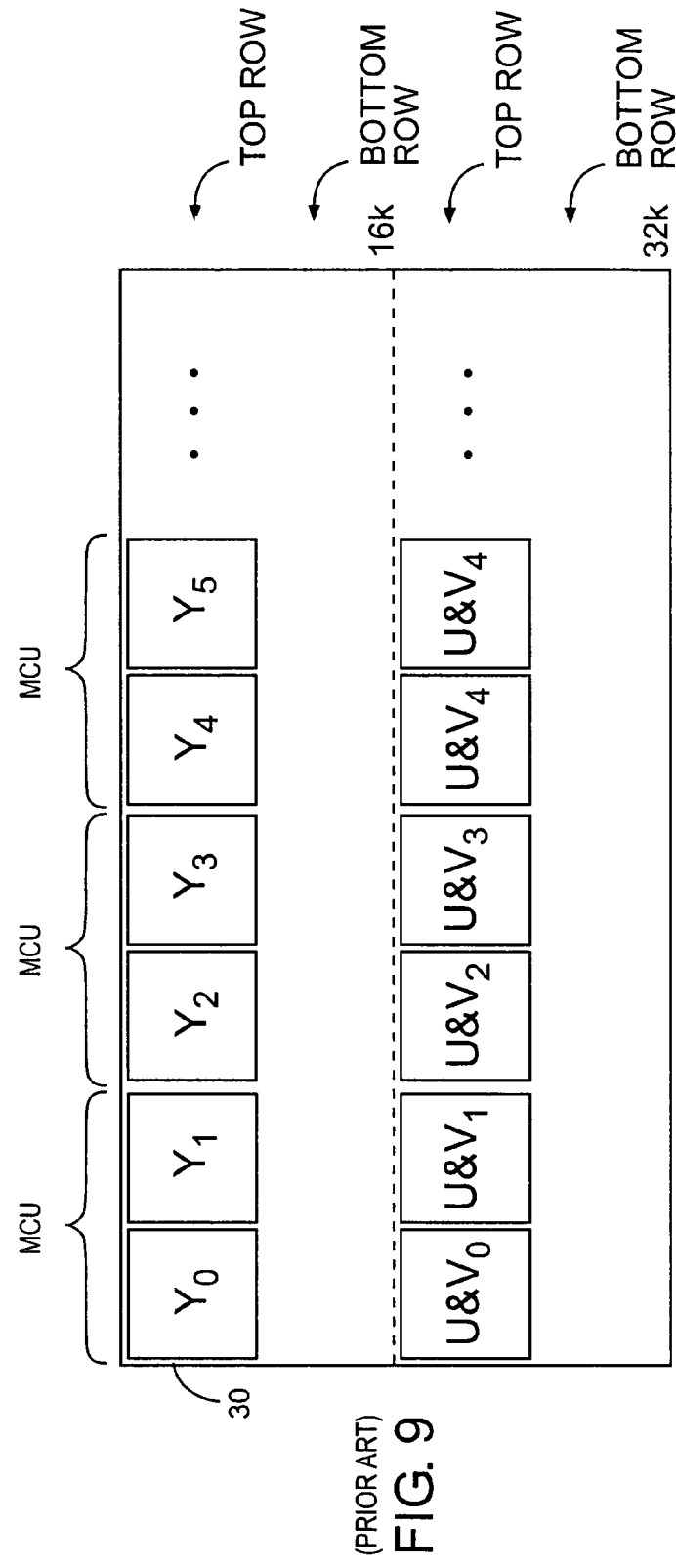
FIG. 9 is a block diagram illustrating three minimum coded units stored in a line buffer.

FIG. 9 illustrates three MCUs stored in the line buffer 30 by the CODEC 28. A dotted line divides the line buffer 30 into top and bottom halves. Blocks of Y samples are stored in the top half of the line buffer 30. Blocks of U and V data are stored in the bottom half. The MCUs were created according to the 4:2:2 sampling format. In FIG. 9, the blocks are arranged in rows. Each half is large enough to store two rows of blocks, designated as a top and bottom row. Each block is 8×8 in size. While FIG. 9 shows only three MCUs stored in the line buffer 30, it should be understood that the line buffer 30 is wide enough to store enough blocks of component samples to form one full display line of pixels. In other words, each row includes enough blocks to assemble one line of pixels in the display device.

The samples may be grouped in blocks of the same type. For example, all samples in the block $Y_0$ are Y samples. Alternately, samples may be grouped in blocks with samples of other types. For example, U samples and V samples are grouped in the $U\&V_0$ block. Further, other arrangements of samples within blocks are possible. Moreover, other arrangements of blocks within the line buffer 30 are contemplated. In one preferred embodiment, the samples are stored so that all of the samples needed to reconstruct successive pixels can be read from the same memory line.

In FIG. 9, blocks are shown only in the top rows of each half. The rows within halves are employed to alternately store the blocks for one line while the blocks for another row are being read in ping-pong fashion. This accommodates the requirement of the dimensional transform circuit 32 for a full line of image data.

For a display having a width of 640 pixels, the line buffer 30 needs to have the capacity to store 40 MCUs. Forty MCUs provide the dimensional transform circuit 32 with enough image data to form one full line of pixels. If forty MCUs were shown stored in the line buffer 30 of FIG. 9, Y blocks ranging from 0 to 80 would be shown in the top row of the top half of the line buffer 30. And U & V blocks ranging from 0 to 80 would be shown in the top row of the bottom half of the line buffer 30.

Forty MCUs of 4:2:2 image data require 10,240 kilobytes of memory. The 40 MCUs actually represent 8 display lines of image data. But, as mentioned, it is necessary to store all 8 lines in order to make one full line available to the dimensional transform circuit 32.

In the example just given of a display having a width of 640 pixels, it was assumed that the MCUs were creating using a 4:2:2 sampling format. The tables below show the memory requirements for several exemplary display widths and for 4:2:2 and 4:4:4 sampling formats. From the tables, it can been seen that the line buffer 30, in the case of one exemplary graphics controller, must be made large enough to store a substantial amount of image data, up to 48 kB.

| | 4:2:2 | | |
|---|---|---|---|
| Display Width | Memory for 16 Lines of Y | Memory for 16 Lines of U, V | Total Memory |
| 640 | (640 * 16)/1024 = 10 kB | 10 kB | 20 kB |
| 800 | (800 * 16)/1024 = 12.5 kB | 12.5 kB | 25 kB |
| 1024 | (1024 * 16)/1024 = 16 kB | 16 kB | 32 kB |

| | 4:4:4 | | |
|---|---|---|---|
| Display Width | Memory for 16 Lines of Y | Memory for 16 Lines of U, V | Total Memory |
| 640 | 10 kB | 20 kB | 30 kB |
| 800 | 12.5 kB | 25 kB | 37.5 kB |
| 1024 | 16 kB | 32 kB | 48 kB |

Figure 10:
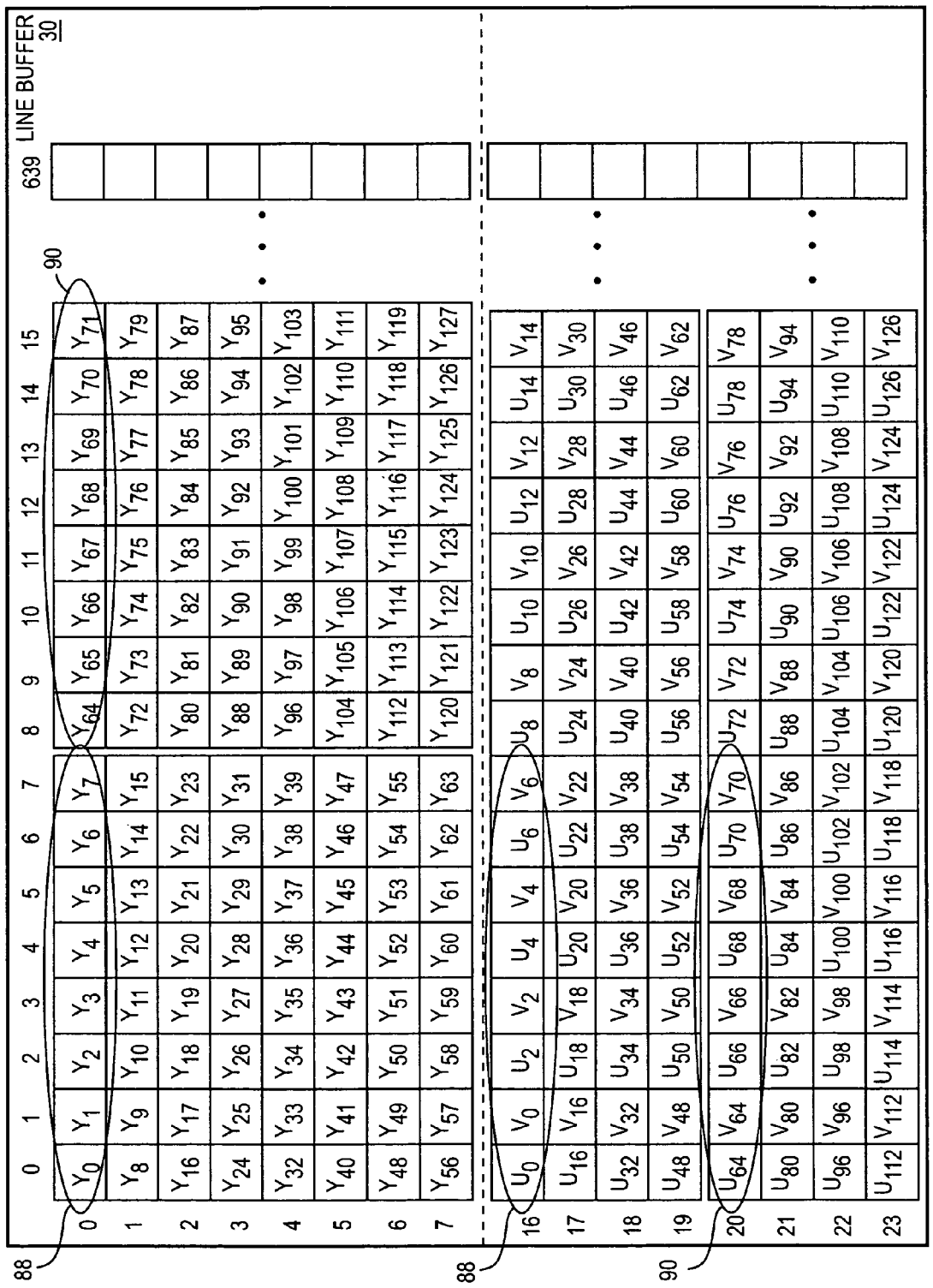
FIG. 10 is a block diagram illustrating the arrangement of individual samples of a minimum coded unit stored in a line buffer.

The dimensional transform circuit 32 reads samples stored in the line buffer 30, assembles the samples into pixels, and after performing any desired dimensional transform operations, such as cropping and scaling, sends the pixels to the color space conversion circuit 34. To obtain any particular pixel, the dimensional transform circuit 32 fetches samples from scattered locations of the memory 30. FIG. 10 shows how the image data needed by the dimensional transform circuit 32 is scattered in the line buffer 30.

FIG. 10 presents a detailed view of one MCU stored in the line buffer 30. In FIG. 10, the individual samples in the Y, and U & V blocks are shown. Column numbers are shown across the top and line numbers are shown along the side. The empty areas (white space) that were shown in FIG. 9 are not shown in FIG. 10. Specifically, the empty areas below the top row of blocks in the top and bottom half of the line buffer are not shown. Similarly, line numbers 8-15 and 24-31 are omitted. Each sample is one byte in size.

Figure 11:
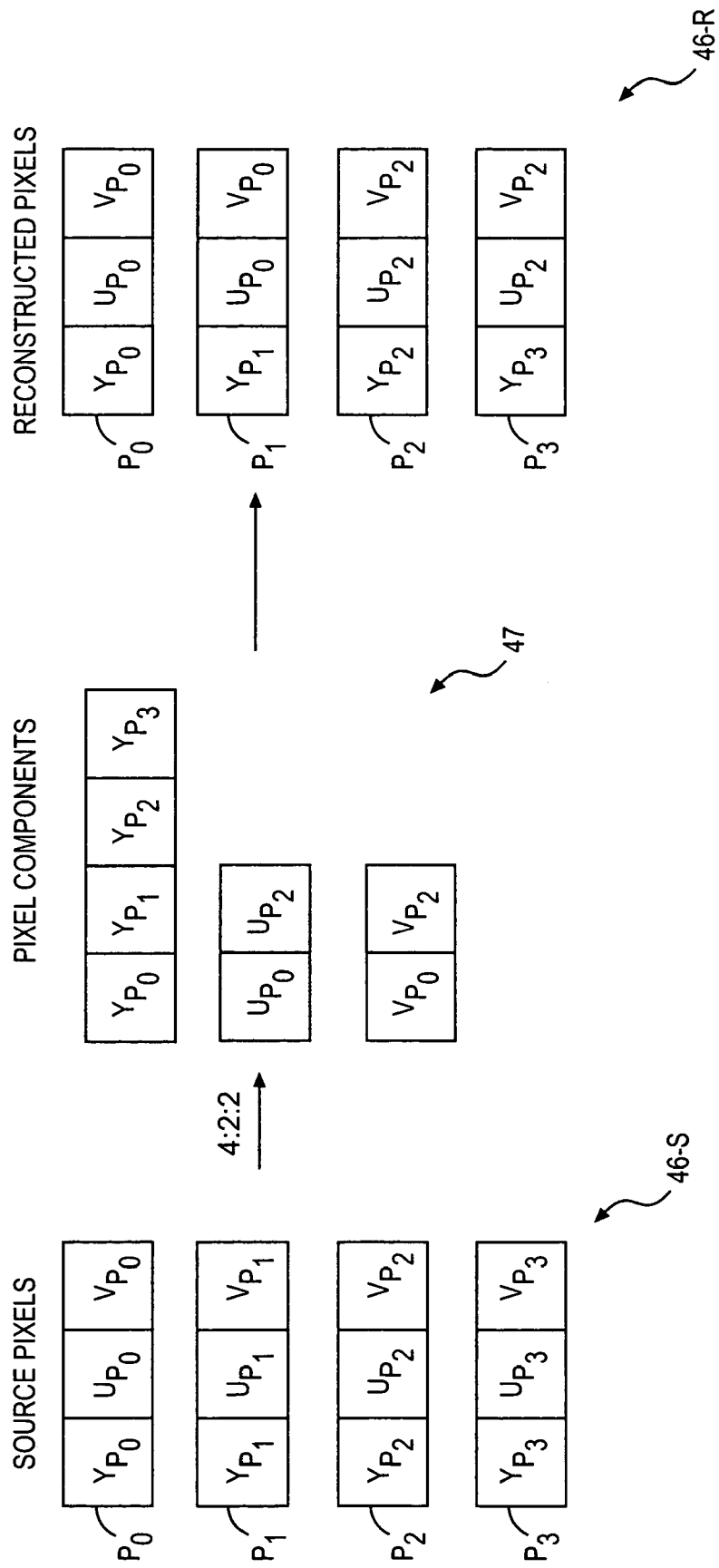
FIG. 11 illustrates source image pixels, component samples selected from the source image pixels, and pixels reconstructed from the selected component samples.

For example, for the dimensional transform circuit 32 to fetch the samples needed to reconstruct the four left-most pixels in the display line, the circuit 32 fetches $Y_0$, $Y_1$, $Y_2$, and $Y_3$ from the top half of the line buffer and $U_0$, $V_0$, $U_2$, and $V_2$ from the bottom half. Samples $Y_0$, $Y_1$, $Y_2$, and $Y_3$ are in line 0, columns 0 to 3 of the line buffer. Samples $U_0$, $V_0$, $U_2$, and $V_2$ are in line 16, columns 0 to 3. FIG. 11 shows how samples such as these are reorganized into YUV pixels.

FIG. 11 shows how the dimensional transform circuit reconstructs pixels from the samples stored in line buffer 30. FIG. 11 shows four original YUV pixels 46-S as they appeared before 4:2:2 chroma sub-sampling. Each pixel has a Y, U and V component. To identify which pixel the components originate from in a source image, each component is specified with a subscript identifying the source pixel. For example, $Y_{Psub0}$ is the Y component of pixel $P_0$.

FIG. 11 also shows the pixel components (samples) 47 that form part of the MCU and which are stored in the line buffer 30. FIG. 11 also shows reconstructed YUV pixels 46-R that are produced by the dimensional transform circuit 32.

While the dimensional transform circuit 32 fetches samples from scattered locations in the line buffer 30, it does so in a manner such that the reconstructed YUV pixels 46-R it provides to the color space converter are in raster order. The first four pixels in a raster sequence are the 4 left-most pixels on the top line: $P_0$, $P_1$, $P_2$, and $P_3$. The pixel components required to reconstruct these pixels are shown in FIG. 11, designated by reference number 47. Referring to FIG. 10, these pixel components are stored in the line buffer 30 on lines 0 and 16 in columns 0 to 3. Thus, the dimensional transform circuit 32 first reads the samples stored in these locations. The next four pixels in the raster sequence are: $P_4$, $P_5$, $P_6$, and $P_7$. The pixel components required to reconstruct these pixels are stored also on lines 0 and 16, but in columns 4 to 7. The samples needed to reconstruct $P_0$ to $P_7$ are enclosed by reference circles 88 in FIG. 10.

The next eight pixels in the raster sequence are $P_8$ to $P_{15}$. The Y pixel components needed to reconstruct these pixels are stored in the line buffer 30 on line 0, columns 8 to 15. The needed U and V pixel components are stored on line 20, columns 0 to 7. The samples needed to reconstruct $P_8$ to $P_{15}$ are enclosed by reference circles 90 in FIG. 10.

In terms of blocks, the dimensional transform circuit 32 reads the components needed to reconstruct $P_0$ to $P_7$ from blocks $Y_0$ and $U\&V_0$. Further, the circuit 32 reads the components needed to reconstruct $P_8$ to $P_{15}$ from blocks $Y_1$ and $U\&V_1$. To read the components needed to reconstruct the next 15 pixels in the raster sequence, namely $P_{16}$ to $P_{23}$, the circuit 32 reads components from blocks $Y_2$, $Y_3$, $U\&V_2$, and $U\&V_3$ (not shown in FIG. 10, but shown in FIG. 9). The dimensional transform circuit 32 reads the needed components in the pattern described above for the first 16 pixels in the raster sequence.

The dimensional transform circuit 32 works its way through (to the right in FIG. 9) the line buffer 30, reading the components needed to assemble 16 pixels from each successive MCU. With each MCU, the dimensional transform circuit 32 reads the needed components in the pattern described above. The dimensional transform circuit 32 continues read components until it has read the components need to reconstruct all of the pixels on the first line. The circuit 32 continues to read components in this fashion until it has read components from the $40^{th}$ MCU.

After the dimensional transform circuit 32 has read a full line, it reads samples for each lower line in a similar manner, beginning with the $Y_0$ and $U_0\&V_0$ blocks, proceeding block by block for left to right, fetching the needed samples from successive MCUs.

In operation, the dimensional transform circuit 32 alternates between reading samples stored in the top and bottom rows (in each half) of the line buffer 30. In other words, the circuit 32 alternately reads the samples needed for 8 lines of pixels from the top rows of the line buffer and then reads the samples for the next 8 lines from the bottom rows of the line buffer.

Figure 12:
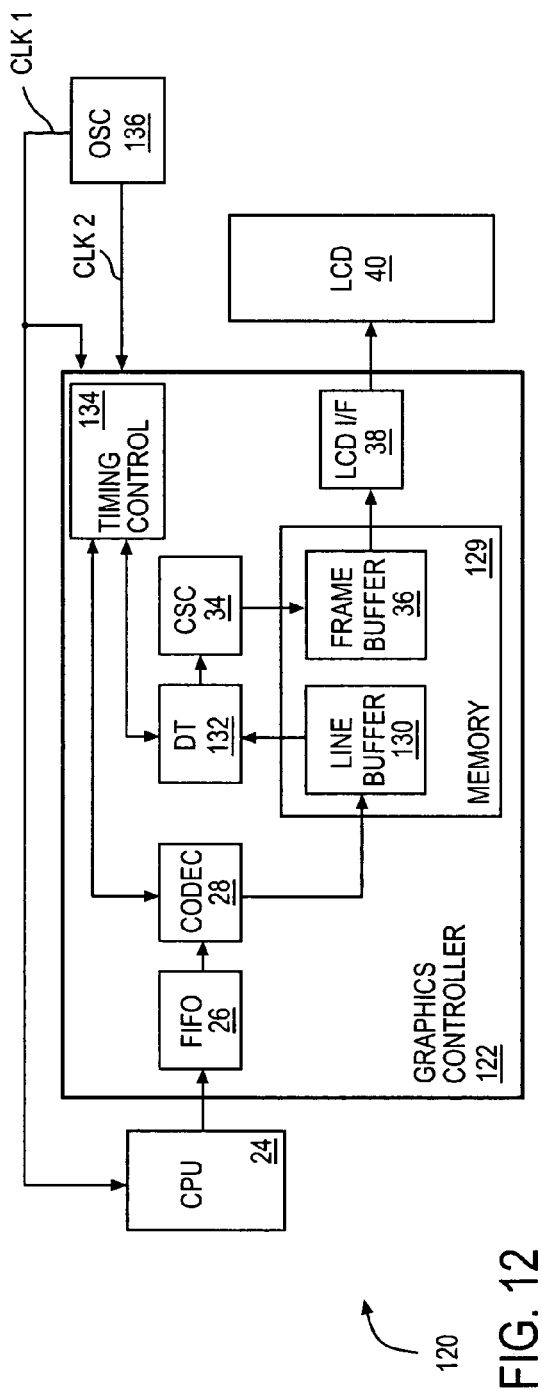
FIG. 12 is a block diagram of a computer system for transforming the dimensions of an image represented by block-interleaved image data, which includes a line buffer, according to one preferred embodiment of the invention.

FIG. 12 shows a block diagram of a computer system 120 having a preferred embodiment of a graphics controller 122 according to the principles of the invention. The graphics controller 122 is structurally somewhat similar to the graphics controller 22. A line buffer 130, however, replaces and is substantially smaller than the line buffer 30 of graphics controller 22. Further, unlike the dimensional transform circuit 32, which dimensionally transforms image data line-by-line, the dimensional transform circuit 132 dimensionally transforms image data MCU-by-MCU. In addition, the graphics controller includes a timing control circuit 134 that controls the operation of the CODEC 28 and the dimensional transform circuit 132. The system includes a pulse source 136 that provides clock pulses for components of the computer system 120.

The pulse source 136 is preferably a crystal oscillator, but may be any known circuit or device for generating pulses. The pulse source 136 produces pulses at first and second frequencies: CLK 1 and CLK 2. Preferably, CLK 2 is a multiple of the frequency of CLK 1. In one embodiment, CLK 2 is one-third of the frequency of CLK 1.

Figure 13:
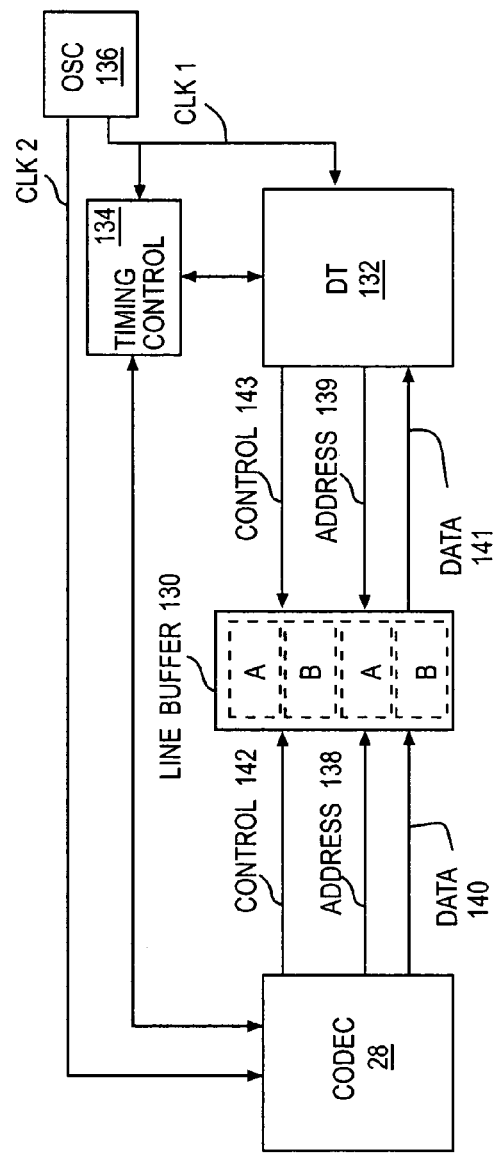
FIG. 13 is a block diagram of selected components of the computer system of FIG. 12.

In FIG. 13, select components of the computer system 120 are shown in greater detail. The CODEC 28 is coupled to the line buffer 130. The CODEC 28 sends addresses over address bus 138 and data over data bus 140. The addresses sent specify where in the line buffer 130 the sent data is to be stored. The CODEC also sends command signals to the line buffer, e.g., a write command, via control bus 142. The CODEC receives signals from the pulse source 136 (CLK 2) and command signals from the timing control circuit 134.

The dimensional transform circuit 132 is coupled to the line buffer 130. The dimensional transform circuit 132 sends addresses on address bus 139 and receives data over data bus 141. The addresses sent specify locations in the line buffer 130 where data is to be read from. The circuit 132 also sends command signals to the line buffer, e.g., a read command, via control bus 143. The circuit 132 receives signals from the pulse source 136 (CLK 1) and command signals from the timing control circuit 134.

The line buffer 130 is of a particular size. The line buffer 130 has a size that is sufficient for storing two minimum coded units of image data, but it is not large enough to store three minimum coded units. The line buffer 130 includes two portions, each of sufficient size for storing one MCU. These portions will be referred to as portions A and B. For instance, the top half of the line buffer may be portion A and the bottom portion B. Alternatively, the top half of the respective top and bottom halves may be portion A, as shown in FIG. 13. Other ways of identifying portions may be employed.

The CODEC 28 stores minimum coded units of image data in the line buffer 130. In operation, the timing circuit 134 issues a command to the CODEC. The CODEC 28 stores one MCU in the line buffer 130. The CODEC stores the MCU in a particular portion of the MCU, such as in a portion A. Either the timing control circuit 134 or the CODEC may identify the particular portion. In either case, the CODEC stores consecutive MCUs in alternate portions of the line buffer. The CODEC stores each MCU in synchronicity with CLK 2.

The dimensional transform circuit 132 dimensionally transforms MCUs of image data stored in the line buffer 130. In operation, the timing circuit 134 issues a command to the dimensional transform circuit 132. The dimensional transform circuit 132 reads one minimum coded unit from one portion of the line buffer 130, for example, portion A. Either the timing control circuit 134 or the dimensional transform circuit 132 may identify the particular portion. In either case, the dimensional transform circuit 132 reads consecutive MCUs from alternate portions of the line buffer. The dimensional transform circuit 132 reads each MCU in synchronicity with CLK 1.

The timing control circuit 134 issues commands to the two circuits and monitors the completion of the commands. The timing control circuit 134 issues commands only when operations previously commanded are complete. For instance, the timing control circuit 134 commands the dimensional transform circuit 132 to transform a particular MCU only after the CODEC 28 has finished storing that MCU. Similarly, the timing control circuit 134 commands the CODEC 28 to store an MCU in a particular portion of the line buffer only after the dimensional transform circuit has finished transforming the MCU previously stored in the same portion of the line buffer.

An example illustrates how the timing control circuit 134 controls the two circuits. First, consider a command from the timing control circuit 134 to the CODEC instructing it to store a first MCU in portion A of the line buffer 130. The CODEC stores the first MCU in portion A. When the CODEC finishes storing the first MCU, the timing control circuit 134 commands the dimensional transform circuit 132 to transform the first MCU. If the transform circuit 132 were to begin operating on the data before the entire MCU was stored, it might attempt to transform some data before it was stored. In this case, the data transformed would be whatever data happened to be previously stored in portion A.

Continuing the example, consider next a command from the timing control circuit 134 to the CODEC to store a second MCU in portion B of the line buffer 130. The CODEC stores the second MCU in portion B. When the CODEC finishes storing the second MCU, its next task will be to store a third MCU. But the third MCU will be stored in portion A and it cannot be stored until the dimensional transform circuit 132 finishes dimensionally transforming the first MCU, which is stored in portion A. If the third MCU were to be stored before the circuit 132 finished dimensionally transforming the first MCU, some data from the third MCU might overwrite the first MCU before it can be read by the circuit 132. The timing control circuit 134 waits until the dimensional transform circuit 132 is finished dimensionally transforming the first MCU before it commands the CODEC to store the third MCU in portion A.

In contrast to the known dimensional transform circuit 32 which dimensionally transforms the image data line-by-line in raster sequence as described above, the dimensional transform circuit 132 dimensionally transforms image data MCU-by-MCU. How the dimensional transform circuit 132 reads samples from the line buffer 130 is described next.

Figures 14, 16:
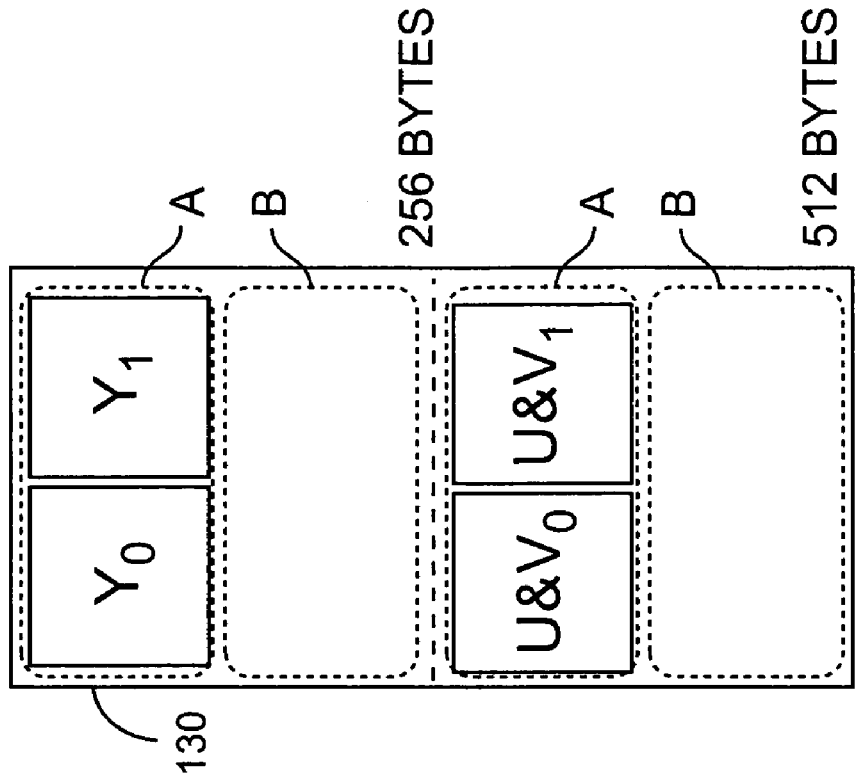
FIG. 14 is a block diagram of the line buffer of FIG. 12 according to one preferred embodiment of the invention.
FIG. 16 is a diagram of a block of samples illustrating the order in which samples are arranged.

FIG. 14 illustrates one MCU stored in the line buffer 130 by the CODEC 28. Blocks of Y samples are stored in the A portion in the top half of the line buffer 30, and blocks of U and V data are stored in the A portion of the bottom half. The MCU was created according to the 4:2:2 sampling format.

Figure 15:
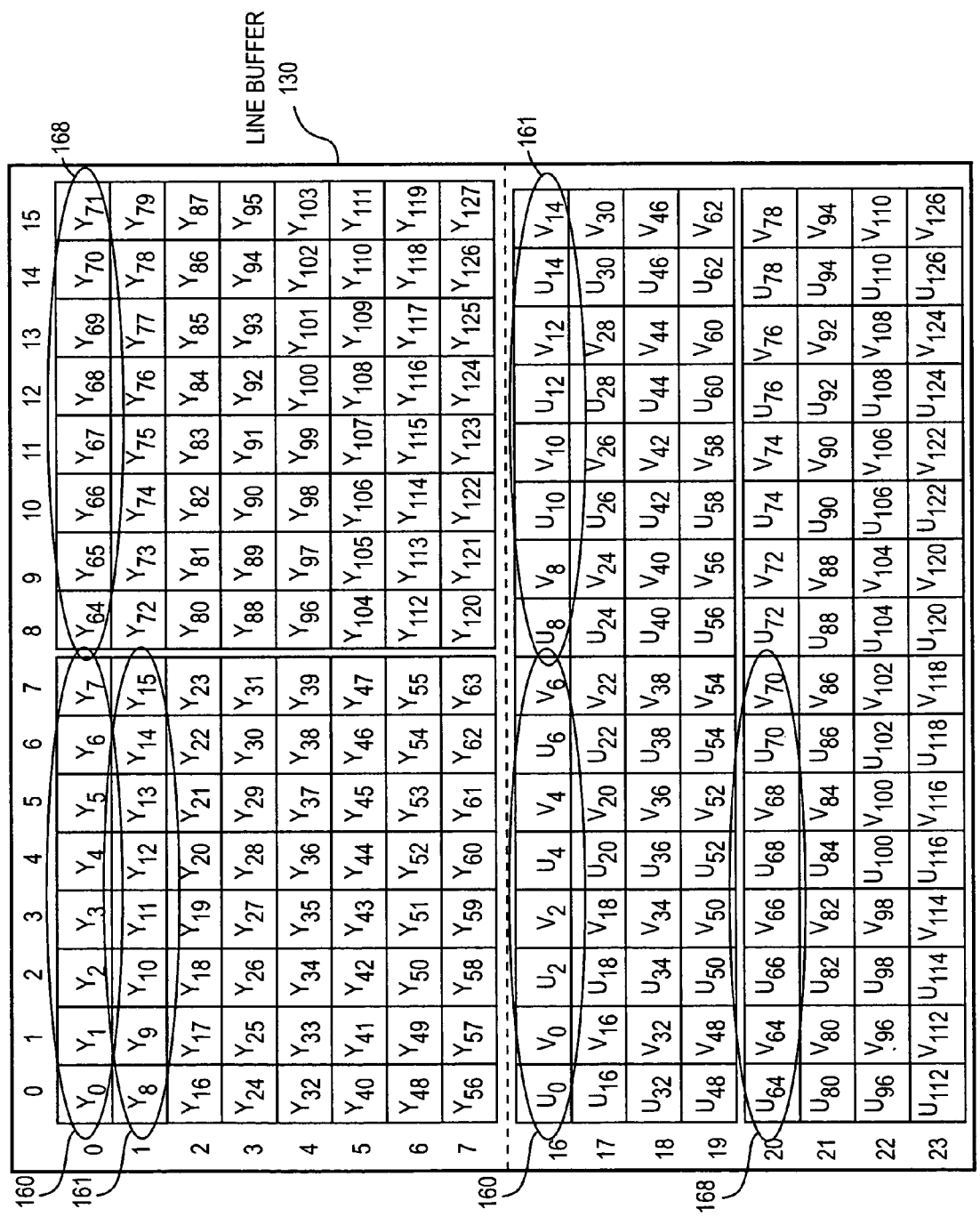
FIG. 15 is a block diagram illustrating the arrangement of individual samples stored in the line buffer of FIG. 14.

FIG. 15 illustrates a detailed view of FIG. 14. FIG. 15 illustrates the individual samples of the Y, and U & V blocks of the MCU stored in the line buffer 130. Column numbers are shown across the top and line numbers are shown along the side. The empty areas (white space) that were shown in FIG. 14 are not shown in FIG. 15. Specifically, the B portions are not shown. Similarly, line numbers 8-15 and 24-31 are omitted. Each sample is one byte in size.

FIG. 16 shows an 8×8 block of reconstructed pixels, such as $P_0$ of FIG. 7a, designated by reference number 144. The block 144 includes 64 boxes, each box representing a pixel. A sequence number is shown inside each box. FIG. 16 illustrates the sequence in which reconstructed pixels are sent from the dimensional transform circuit 132 to the color space converter. Pixels are sent by the dimensional transform circuit 132 to the color space converter in accord with the shown sequence number. The first pixel sent is the pixel 0 at (0, 0) and the last pixel sent is pixel 63 at (7, 7).

The sequence, as shown in FIG. 16, in which the dimensional transform circuit 132 sends reconstructed pixels can be stated in general terms. Any block of pixels may be defined by two corner pixels $P_{X,Y}$ and $P_{X+N, Y+N}$, where X, Y, and N, are integers. The variables X and Y denote, respectively, arbitrary horizontal and vertical coordinates in the image. For example, the upper-left-most block of pixels $P_0$ in an image may be defined by corner pixels $P_{0, 0}$ and $P_{7, 7}$ (See FIG. 7a). An adjacent block of pixels $P_1$ to the right of $P_0$ may be defined by corner pixels $P_{8, 0}$ and $P_{8, 7}$. Each block of pixels includes a plurality of pixels $P_{X+n, Y+n}$, where n is an integer and ranges sequentially from zero to N−1. For block $P_0$, X is 0 and Y is 0. Because the pixel block 144 is an N×N matrix, where N equals 8, n ranges sequentially from 0 to 7.

As was shown with reference to FIG. 11, the pixels components $Y_0$, $Y_1$, $Y_2$, $Y_3$, $U_0$, $V_0$, $U_2$, and $V_2$ are need by the dimensional transform circuit 132 to reconstruct the pixels 0, 1, 2, and 3. Referring to the diagram of the line buffer 130 shown in FIG. 15, the Y samples are stored in line 0, columns 0 to 3 and the U and V samples are stored in line 16, columns 0 to 3.

Similarly, to reconstruct the pixels 4, 5, 6, and 7, the circuit 132 needs the following pixels components: $Y_4$, $Y_5$, $Y_6$, $Y_7$, $U_4$, $V_4$, $U_6$, and $V_6$. These samples are stored in line 0, columns 4 to 7 and in line 16, columns 4 to 7. The samples needed to reconstruct pixels 0 to 7 are enclosed by reference circles 160 in FIG. 15.

The dimensional transform circuit 132 first reads the pixel components inside the reference circles 160 (FIG. 15) so as to sequentially provide the pixels 0 to 7 (FIG. 16) to the color space conversion circuit 34. (Of course, the circuit 132 may not provide some of the pixels 0 to 7 to the CSC circuit 34 on account of scaling or cropping operations.) The dimensional transform circuit 132 may read the samples individually or in groups, depending on the width of data bus 141.

The circuit 132 next reads the samples needed to reconstruct pixels 8 to 15, which is the next lower line in the block 144 (FIG. 16). The samples needed to reconstruct pixels 8 to 15 are enclosed by reference circles 161 in FIG. 15.

The circuit 132 next reads the samples needed to reconstruct the next lower line in the block, pixels 16 to 23. The circuit 132 successively reads each next lower line until it has read the samples needed to reconstruct the pixels 56 to 63. After having read the samples needed to reconstruct these pixels, the circuit 132 has read all of the samples needed to reconstruct one block of pixels.

As shown in FIG. 15, two blocks of pixels are defined by the 4:2:2 MCU stored in the line buffer 130. The circuit 132 next proceeds to read the samples needed to reconstruct another block of pixels. The samples needed to reconstruct the first group of pixels in the second blocks are enclosed by reference circles 168 in FIG. 15.

The dimensional transform circuit 132 reads the samples needed to reconstruct each next lower line pixels until it has read the samples needed to reconstruct all of the pixels in the second block. The circuit 132 reads the needed samples in the same pattern described in above for the first block of pixels defined by the MCU.

When the circuit 132 has read all of the samples needed to reconstruct the pixels in the second block it has completed reading the MCU.

This explanation of how the dimensional transform circuit 132 reads samples from the line buffer 130 so as to dimensionally transform an MCU assumed a 4:2:2 MCU. The circuit 132 may dimensionally transform MCUs created according to other sampling formats. With other types of MCUs, the circuit 132 still provides pixels to the CSC circuit 34 in the sequence described. The locations in the line buffer 130 where the samples needed to reconstruct particular pixels are stored will vary, however, from the locations described above. The invention contemplates, for MCUs in other sampling formats, that the pattern in which the dimensional transform circuit 132 fetches samples from the line buffer 130 is modified accordingly.

Using generalized terminology introduced above with reference to pixel block 144, the sequence in which the dimensional transform circuit 132 reads needed pixel components may be defined in general terms. The dimensional transform circuit 132 first reads the pixel components needed to reconstruct the pixels $P_{X, Y}$ to $P_{X+n, Y}$, where n is an integer that ranges sequentially from zero to N. After reading the pixel components needed to reconstruct the pixels $P_{X, Y}$ to $P_{X+n, Y}$, the dimensional transform circuit 132 reads the pixel components needed to reconstruct the pixel $P_{X, Y+1}$ to $P_{X+m, Y+1}$, where m is an integer that ranges sequentially from zero to N. The circuit 132 continues reading pixels in this pattern until all of the rows in the block of pixels, that is, rows Y+1, Y+2, Y+3, Y+4 . . . Y+7 have been read.

As described above, the dimensional transform circuit 132 alternates between reading the MCUs stored in the portions A and B of the line buffer 130. As the circuit 132 reads the MCUs in the portions A and B, it reads the samples in the patterns described above for the single MCU.

The dimensional transform circuit 132, after reading samples as described above, assembles the samples into pixels and sends the pixels to the color space conversion circuit 34. The CSC circuit 34 converts the pixels into the RGB format and stores them in the frame buffer 36. The LCD interface circuit 38 reads pixels from the frame buffer 36 and sends them in raster order to the display device 40 for display.

The invention is also directed to a method for transforming the dimensions of an image represented by block-interleaved data. The method may be embodied in hardware, firmware, software, or in a combination of these embodiments. Further, in another embodiment, this method may be embodied in a program of instructions and stored on a machine-readable medium. A machine, such as a computer system, reads the medium and executes the instructions to perform the method.

Figure 17:
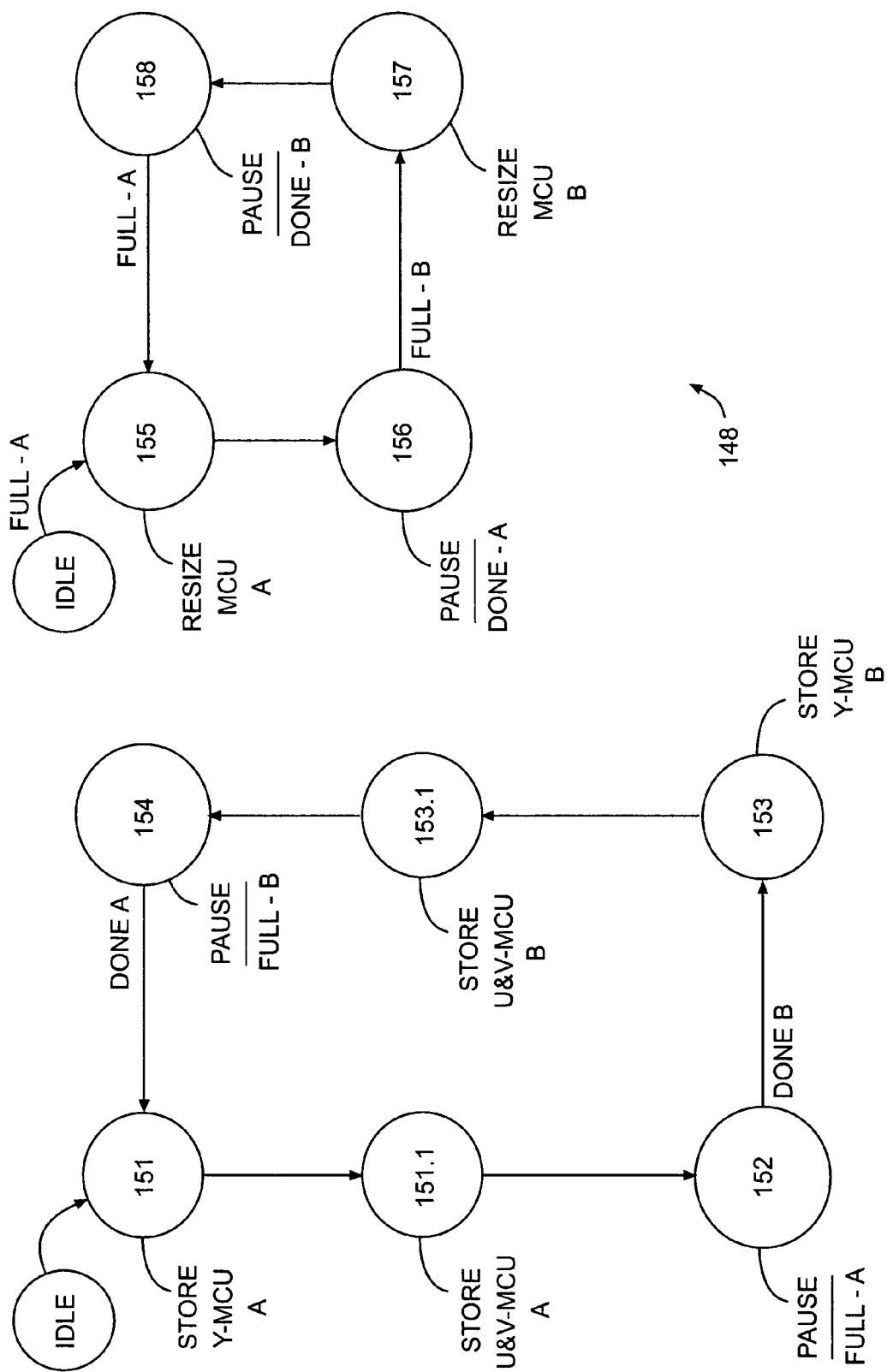
FIG. 17 a diagram of two state machines according to one preferred embodiment of the invention.

FIG. 17 shows state diagrams 146 and 148 according to a preferred embodiment of the invention. The method for transforming the dimensions of an image represented by block-interleaved data is described with reference to these state diagrams.

State machine 146 waits in the idle state. In state 151, a command is issued to store the Y components of the MCU (Y-MCU) in a memory A. When the Y-MCU is stored, the state machine transitions to state 151.1. In the state 151.1, the U&V components of the same MCU (U&V MCU) are stored in the memory A. After the U&V-MCU is stored, the state machine transitions to state 152 where it waits to issue further commands until it receives a signal from state machine 148 that any MCU stored in a memory B has been dimensionally transformed. In addition, it issues a "Full-A" signal, signifying that the entire MCU has been stored.

When the state machine 146 receives a signal that any MCU stored in a memory B has been dimensionally transformed, it proceeds to state 153. In state 153, a command is issued to store the Y components of another MCU in a memory B. When the Y-MCU is stored, the state machine 146 transitions to state 153.1. In the state 153.1, the U&V components of the same MCU are stored in memory B. After the U&V-MCU is stored, the state machine transitions to state 154 where it waits to issue further commands until it receives a signal from state machine 148 that any MCU stored in the memory A has been dimensionally transformed. In addition, it issues the "Full-B" signal in state 154, signifying that the entire MCU has been stored.

State machine 148 waits in the idle state. In state 155, a command is issued to dimensionally transform an MCU stored in memory A. When this MCU is dimensionally transformed, the state machine 148 transitions to state 156 where it waits to issue further commands until it receives a signal (FULL-B) from state machine 146, indicating that any MCU stored in memory B has been fully stored. In addition, it issues a "DONE-A" signal, signifying that the entire MCU stored in memory A has been dimensionally transformed. When the state machine 148 receives a signal that an MCU has been fully stored in memory B, it transitions to state 157 where the MCU stored in memory B is dimensionally transformed. When this MCU is dimensionally transformed, the state machine 148 transitions to state 158 where it waits to issue further commands until it receives a signal (FULL-A) from state machine 146 that any MCU stored in memory A has been fully stored. In addition, it issues a "DONE-B" signal, signifying that the entire MCU stored in memory B has been dimensionally transformed.

The invention has been illustrated with MCUs according to the 4:4:4, 4:2:2, and 4:1:1 sampling formats. The invention in not limited, however, to these exemplary sampling formats. The principles of the invention are equally applicable to other sampling formats, such as 4:2:0 or 4:0:0.

The invention has been illustrated with reference to the YUV and RGB color formats. The invention may be practiced with any color format or color model, such as CMY, YIQ, or CIE, or any variation on any color format or model. Further, the invention may be practiced with a gray-scale image.

The invention has been illustrated with an LCD. It will be appreciated that the invention may be practices with any similar or equivalent device for rendering a source image comprised of pixels, such as a CRT, an OLED, a plasma display, or a printer or other device for rendering hard copy images.

The terms and expressions that have been employed in the foregoing specification are used as terms of description and not of limitation, and are not intended to exclude equivalents of the features shown and described or portions of them. The scope of the invention is defined and limited only by the claims that follow.

The invention claimed is:

1. A method for transforming the dimensions of an image represented by two or more minimum coded units of data arranged in a block-interleaved format, each minimum coded unit corresponding with one 8×8 block of pixel data and including at least two blocks of pixel component data, the method comprising:
    (a) storing a first minimum coded unit in a first memory, the first memory having a capacity that is sufficient to store two minimum coded units, but which is insufficient to store three minimum coded units;
    (b) dimensionally transforming the first minimum coded unit after step (a); and
    (c) storing a second minimum coded unit in the first memory after the step (a), wherein the step (b) is performed before starting to store any third minimum coded unit in the first memory after the step (c); and wherein each block of pixels data is defined by two corner pixels P.sub.X, Y and P.sub.X+N, Y+N, where N is an integer, and X and Y are integers, and wherein the step (b) of dimensionally transforming further comprises: reading the pixel components needed to sequentially reconstruct the pixels P.sub.X, Y to P.sub.X+n, Y, where n is an integer that ranges from zero to N, and thereafter reading the pixel components needed to sequentially reconstruct the pixel P.sub.X. Y+1 to P.sub.X+n; Y+1.

2. The method of claim 1, further comprising:
    (d) storing a third minimum coded unit in the first memory; and
    (e) dimensionally transforming the second minimum coded unit after step (c), wherein the step (e) is performed before starting to store any fourth minimum coded unit in the first memory after the step (d).

3. The method of claim 1, further comprising a step of grouping the pixel component data in the first minimum coded unit into pixel data.

4. The method of claim 3, wherein the pixel component data in the first minimum coded unit is in a first color format, further comprising a step of converting the pixel component data in the first minimum coded unit from the first color format to a second color format.

5. The method of claim 4, further comprising a step of storing the grouped pixel component data in a second memory as pixel data.

6. The method of claim 5, wherein the first memory and second memory are distinct.

7. A computer-readable medium having a program of instructions stored on the medium, the instructions being executable by a machine, wherein, when the instructions are accessed by the machine, the machine performs a method for transforming the dimensions of an image represented by two or more minimum coded units of data arranged in a block-interleaved format, each minimum coded unit corresponding with one 8×8 block of pixel data and including at least two blocks of pixel component data, the method comprising:
    (a) storing a first minimum coded unit in a first memory, the first memory having a capacity that is sufficient to store two minimum coded units, but which is insufficient to store three minimum coded units;
    (b) dimensionally transforming the first minimum coded unit after step (a); and
    (c) storing a second minimum coded unit in the first memory after the step (a), wherein the step (b) is performed before starting to store any third minimum coded unit in the first memory after the step (c); and wherein each block of pixels data is defined by two corner pixels P.sub.X, Y and P.sub.X+N, Y+N, where N is an integer, and X and Y are integers, and wherein the step (b) of dimensionally transforming further comprises: reading the pixel components needed to sequentially reconstruct the pixels P.sub.X, Y to P.sub.X+n, Y, where n is an integer that ranges from zero to N, and thereafter reading the pixel components needed to sequentially reconstruct the pixel P.sub.X, Y+1 to P.sub.X+n, Y+1.

8. The medium of claim 7, further comprising:
    (d) storing a third minimum coded unit n the first memory; and
    (e) dimensionally transforming the second minimum coded unit after step (c), wherein the step (e) is performed before starting to store any fourth minimum coded unit in the first memory after the step (d).

9. The medium of claim 8, further comprising a step of grouping the pixel component data in the first minimum coded unit into pixel data.

10. The medium of claim 9, wherein the pixel component data in the first minimum coded unit is in a first color format, further comprising a step of converting the pixel component data in the first minimum coded unit from the first color format to a second color format.

11. The medium of claim 10, further comprising a step of storing the grouped pixel component data in a second memory as pixel data.

12. The medium of claim 11, wherein the first memory and second memory are distinct.

13. An apparatus for transforming the dimensions of an image represented by two or more minimum coded units of data arranged in a block-interleaved format, each minimum coded unit corresponding with one 8×8 block of pixel data and including at least two blocks of pixel component data, the apparatus comprising: a storing circuit to store minimum coded units in a first memory; a dimensional transforming circuit to dimensionally transform the minimum coded units; and a timing control circuit to control: the storing circuit such that the storing circuit stores at a time T1 a first minimum coded unit in the first memory, and stores at a time T2 after time T1 a second minimum coded unit in the first memory; and the dimensional transforming circuit such that the dimensional transforming circuit dimensionally transforms the first minimum coded unit after the time T1, and before the storing circuit starts to store any third minimum coded unit in the first memory after time T2, wherein the first memory has a capacity that is sufficient to store two minimum coded units, but which is insufficient to store three minimum coded units; and wherein each block of pixels data is defined by two corner pixels P.sub.X, Y and P.sub.X+N, Y+N, where N is an integer, and X and Y are integers denoting two-dimensional coordinates of the pixels, and wherein the dimensional transforming circuit: groups pixel component data into pixel data by reading the pixel components needed to sequentially reconstruct the pixels $P_{X,Y}$ to $P_{X+n,Y}$, where n is an integer that ranges from zero to N−1, and thereafter reading the pixel components needed to sequentially reconstruct the pixel $P_{X,Y+1}$ to $P_{X+n,Y+1}$.

14. The apparatus of claim 13, wherein the storing circuit comprises a CODEC.

15. The apparatus of claim 13, wherein the timing control circuit comprises a pulse source, a first output for providing pulses at a first frequency, and a second output for providing pulses at a second frequency, the first output being coupled to the storing circuit, and the second output being coupled to the dimensional transforming circuit.

16. The apparatus of claim 13, wherein the dimensional transforming circuit groups the pixel component data in the first minimum coded unit into pixel data.

17. The apparatus of claim 16, wherein the pixel component data in the first minimum coded unit is in a first color format, further comprising a color-space-conversion circuit for converting the pixel component data in the first minimum coded unit from the first color format to a second color format.

18. The apparatus of claim 17, wherein the color-space-conversion circuit stores the pixel data in a second memory.

19. The apparatus of claim 18, wherein the first memory and second memory are distinct.

20. A computer system for transforming the dimensions of an image represented by two or more minimum coded units of data arranged in a block-interleaved format, each minimum coded unit corresponding with one 8×8 block of pixel data and including at least two blocks of pixel components, the apparatus comprising: a CPU; a display device; a storing circuit to store minimum coded units in a first memory; a dimensional transforming circuit to dimensionally transform the minimum coded units; and a timing control circuit to control: the storing circuit such that the storing circuit stores at a time T1 a first minimum coded unit in the first memory, and stores at a time T2 after time T1 a second minimum coded unit in the first memory; and the dimensional transforming circuit such that the dimensional transforming circuit dimensionally transforms the first minimum coded unit after the time T1, and before the storing circuit starts to store any third minimum coded unit in the first memory after time T2, wherein the first memory has a capacity that is sufficient to store two minimum coded units, but which is insufficient to store three minimum coded units; and wherein each block of pixels data is defined by two corner pixels $P_{X,Y}$ and $P_{X+N,Y+N}$, where N is an integer, and X and Y are integers denoting two-dimensional coordinates of the pixels, and wherein the dimensional transforming circuit: groups pixel component data into pixel data by reading the pixel components needed to sequentially reconstruct the pixels $P_{X,Y}$ to $P_{X+n,Y}$, where n is an integer that ranges from zero to N, and thereafter reading the pixel components needed to sequentially reconstruct the pixel $P_{X,Y+1}$ to $P_{X+n,Y+1}$.

21. The computer system of claim 20, wherein the storing circuit comprises a CODEC.

22. The computer system of claim 20, wherein the timing control circuit comprises a pulse source, a first output for providing pulses at a first frequency, and a second output for providing pulses at a second frequency, the first output being coupled to the storing circuit, and the second output being coupled to the dimensional transforming circuit.

23. The computer system of claim 20, wherein the dimensional transforming circuit groups the pixel component data in the first minimum coded unit into pixel data.

24. The computer system of claim 23, wherein the pixel component data in the first minimum coded unit is in a first color format, further comprising a color-space-conversion circuit for converting the pixel component data in the first minimum coded unit from the first color format to a second color format.

25. The computer system of claim 24, wherein the color-space-conversion circuit stores the pixel data in a second memory.

26. The computer system of claim 25, wherein the first memory and second memory are distinct.

* * * * *

UNITED STATES PATENT AND TRADEMARK OFFICE
CERTIFICATE OF CORRECTION

PATENT NO. : 7,386,178 B2
APPLICATION NO. : 10/902552
DATED : June 10, 2008
INVENTOR(S) : Barinder Singh Rai et al.

It is certified that error appears in the above-identified patent and that said Letters Patent is hereby corrected as shown below:

Column 15,
Line 34, please change "P.sub.X, Y and P.sub.X+N, Y+N," to --$P_{X,Y}$ and $P_{X+N,Y+N}$,--;

Line 38, please change "P.sub.X, Y to P.sub.X+n, Y," to --$P_{X,Y}$ to $P_{X+N,Y}$,--; and Lines 41 and 42, please change "P.sub.X. Y+1 to P.sub.X+n; Y+1." to --$P_{X,Y+1}$ to $P_{X+n,Y+1}$.--.

Column 16,
Line 16, please change "P.sub.X, Y and P.sub.X+N, Y+N," to --$P_{X,Y}$ and $P_{X+N,Y+N}$,--;

Line 20, please change "P.sub.X, Y to P.sub.X+n, Y," to --$P_{X,Y}$ to $P_{X+n,Y}$,--;

Line 23 and 24, please change "P.sub.X, Y+1 to P.sub.X+n, Y+1." to --$P_{X,Y+1}$ to $P_{X+n,Y+1}$.--; and Lines 65 and 66, please change "P.sub.X, Y and P.sub.X+N, Y+N," to --$P_{X,Y}$ and $P_{X+N,Y+N}$,--.

Column 17,
Line 4, please change "P.sub.X, Y to P.sub.X+n, Y," to --$P_{X,Y}$ to $P_{X+n,Y}$,--; and Lines 6 and 7, please change "P.sub.X, Y+1 to P.sub.X+n, Y+1." to --$P_{X,Y+1}$ to $P_{X+n,Y+1}$.--.

Column 18,
Lines 8 and 9, please change "P.sub.X, Y and P.sub.X+N, Y+N," to --$P_{X,Y}$ and $P_{X+N,Y+N}$,--;

Line 14, please change "P.sub.X, Y to P.sub.X+n, Y," to --$P_{X,Y}$ to $P_{X+n,Y}$,--; and

UNITED STATES PATENT AND TRADEMARK OFFICE
CERTIFICATE OF CORRECTION

PATENT NO. : 7,386,178 B2
APPLICATION NO. : 10/902552
DATED : June 10, 2008
INVENTOR(S) : Barinder Singh Rai et al.

It is certified that error appears in the above-identified patent and that said Letters Patent is hereby corrected as shown below:

Lines 16 and 17, please change "P.sub.X, Y+1 to P.sub.X+n, Y+1." to --$P_{X, Y+1}$ to $P_{X+n, Y+1}$.--.

Signed and Sealed this

Thirteenth Day of January, 2009

JON W. DUDAS
*Director of the United States Patent and Trademark Office*